US007922437B1

(12) United States Patent
Loftin et al.

(10) Patent No.: US 7,922,437 B1
(45) Date of Patent: Apr. 12, 2011

(54) DISPLAY SYSTEM, DISPENSING DEVICE AND PACKAGE FOR USE THEREIN

(75) Inventors: Caleb S. Loftin, Raleigh, NC (US); Aaron L. Bates, Raleigh, NC (US); Laurel Thomas, Raleigh, NC (US); Derek King, Daventry (GB); John Gelardi, Wake Forest, NC (US)

(73) Assignee: MeadWestvaco Corporation, Richmond, VA (US)

( * ) Notice: Subject to any disclaimer, the term of this patent is extended or adjusted under 35 U.S.C. 154(b) by 0 days.

(21) Appl. No.: 12/777,444

(22) Filed: May 11, 2010

Related U.S. Application Data

(60) Provisional application No. 61/263,767, filed on Nov. 23, 2009.

(51) Int. Cl.
*B65G 65/23* (2006.01)

(52) U.S. Cl. ............ 414/412; 83/856; 83/946; 229/204; 229/122.2

(58) Field of Classification Search ................. 53/381.2; 221/31; 83/946, 856; 414/412; 229/204, 229/122.2
See application file for complete search history.

(56) References Cited

U.S. PATENT DOCUMENTS

| | | | | |
|---|---|---|---|---|
| 902,347 | A | 10/1908 | Tillinghast | |
| 1,291,420 | A | 1/1919 | Cough | |
| 1,383,318 | A | 7/1921 | McCormick | |
| 1,393,964 | A | 10/1921 | Potts et al. | |
| 1,824,937 | A * | 9/1931 | Trouth | 414/412 |
| 1,898,056 | A | 2/1933 | Johnson | |
| 1,919,907 | A | 7/1933 | Robinson | |
| 1,932,225 | A | 10/1933 | Minter | |
| 1,941,458 | A | 2/1934 | Bens | |
| 1,985,739 | A | 12/1934 | Murray | |
| 2,078,599 | A * | 4/1937 | McCauley | 414/412 |
| 2,110,194 | A | 3/1938 | Blier | |
| 2,263,353 | A | 11/1941 | Eidam | |
| 2,536,421 | A | 2/1951 | Burhans | |
| 2,573,381 | A | 10/1951 | Arnold | |
| 2,574,087 | A | 11/1951 | Burhans | |
| 2,595,122 | A | 4/1952 | Burhans | |
| 2,784,871 | A | 3/1957 | Gabrielsen | |
| 2,795,845 | A * | 6/1957 | Shimer | 30/2 |
| 2,818,978 | A | 1/1958 | Post | |
| 2,826,471 | A | 3/1958 | Fonda | |
| 2,831,591 | A * | 4/1958 | Morton | 414/412 |
| 2,888,145 | A | 5/1959 | Fred | |
| 2,915,932 | A | 12/1959 | Gross | |
| 2,919,488 | A | 1/1960 | Brownlee | |
| 2,996,344 | A | 8/1961 | Garman | |

(Continued)

FOREIGN PATENT DOCUMENTS

JP 03105494 A 5/1991

(Continued)

*Primary Examiner* — Kenneth E. Peterson
(74) *Attorney, Agent, or Firm* — Walters & Wasylyna, LLC

(57) ABSTRACT

Disclosed is a system and method for dispensing products provided initially in a package. The system includes a frame and an opening tool. The frame has longitudinally opposed front and rear end sections and includes an upper support deck extending at least partially between the front and rear end sections and below which a product display area is provided. The opening tool is associated with the frame and is arranged to open the package when the package is moved longitudinally on the upper support deck and relative to the opening tool thereby allowing the products to be at least partially dispensed from the package into the product display area.

12 Claims, 26 Drawing Sheets

U.S. PATENT DOCUMENTS

| | | | | |
|---|---|---|---|---|
| 3,018,149 | A | 1/1962 | Parker | |
| 3,055,293 | A | 11/1962 | Lariccia | |
| 3,066,827 | A | 12/1962 | Pryor | |
| 3,137,068 | A | 6/1964 | Quigley | |
| D198,888 | S | 8/1964 | Heselov | |
| 3,178,242 | A | 4/1965 | Ellis et al. | |
| 3,184,104 | A | 5/1965 | De Domenico et al. | |
| 3,203,554 | A | 8/1965 | Pendergrast, Jr. et al. | |
| 3,204,335 | A | 9/1965 | Hughes | |
| 3,288,544 | A | 11/1966 | Knecht | |
| 3,300,115 | A | 1/1967 | Schauer | |
| 3,304,141 | A | 2/1967 | Rogers | |
| 3,318,455 | A | 5/1967 | Takahashi | |
| 3,335,940 | A | 8/1967 | Dykes | |
| 3,340,790 | A * | 9/1967 | Simjian | 99/352 |
| 3,348,738 | A * | 10/1967 | Hertlein | 222/88 |
| 3,393,808 | A | 7/1968 | Chirchill | |
| 3,501,016 | A | 3/1970 | Eaton | |
| 3,763,557 | A | 10/1973 | Sewell | |
| 3,784,022 | A | 1/1974 | Beesley, Jr. | |
| 3,922,778 | A | 12/1975 | Aalpoel | |
| 3,923,159 | A | 12/1975 | Taylor et al. | |
| 3,972,454 | A * | 8/1976 | Croley | 222/541.6 |
| 4,105,126 | A | 8/1978 | Deffner et al. | |
| 4,205,440 | A | 6/1980 | Morgan | |
| 4,382,526 | A | 5/1983 | Stone | |
| 4,396,143 | A | 8/1983 | Killy | |
| 4,435,026 | A | 3/1984 | Johnson | |
| 4,467,524 | A | 8/1984 | Ruff et al. | |
| 4,576,272 | A | 3/1986 | Morgan, Jr. | |
| 4,598,828 | A | 7/1986 | Young et al. | |
| 4,729,480 | A | 3/1988 | Groover et al. | |
| 4,744,489 | A | 5/1988 | Binder et al. | |
| 4,834,263 | A | 5/1989 | Becze | |
| 4,869,395 | A | 9/1989 | Rubbmark | |
| 4,911,309 | A | 3/1990 | Stefan | |
| 4,915,571 | A | 4/1990 | Toshihiko et al. | |
| 4,923,070 | A | 5/1990 | Jackle et al. | |
| 4,997,106 | A | 3/1991 | Rockola | |
| 4,998,628 | A | 3/1991 | Ross | |
| 5,033,348 | A | 7/1991 | Walsh | |
| 5,080,256 | A | 1/1992 | Rockola | |
| 5,101,703 | A | 4/1992 | Tanaka et al. | |
| 5,167,345 | A | 12/1992 | Bleeker | |
| 5,251,972 | A | 10/1993 | Zurawin | |
| 5,289,943 | A | 3/1994 | Powell | |
| 5,314,078 | A | 5/1994 | Morikiyo et al. | |
| 5,328,258 | A | 7/1994 | Scalise | |
| 5,372,278 | A * | 12/1994 | Leight | 221/174 |
| 5,390,821 | A | 2/1995 | Markel | |
| 5,396,997 | A | 3/1995 | Johnson | |
| D363,174 | S | 10/1995 | Fletcher, Sr. | |
| 5,462,198 | A | 10/1995 | Schwimmer | |
| 5,529,207 | A | 6/1996 | Oden et al. | |
| 5,638,988 | A * | 6/1997 | Rogers et al. | 222/81 |
| 5,685,664 | A | 11/1997 | Parham et al. | |
| 5,740,610 | A | 4/1998 | Ayer et al. | |
| 5,788,117 | A | 8/1998 | Zimmanck | |
| 5,791,048 | A | 8/1998 | Bodnar et al. | |
| 5,836,478 | A | 11/1998 | Weiss | |
| 5,878,862 | A | 3/1999 | Dewsnap | |
| 5,894,942 | A | 4/1999 | Miyashita et al. | |
| 5,992,286 | A | 11/1999 | Boole | |
| 5,992,652 | A | 11/1999 | Springs | |
| 6,186,345 | B1 | 2/2001 | Robertson | |
| 6,199,720 | B1 | 3/2001 | Rudick et al. | |
| 6,206,237 | B1 | 3/2001 | Dillon et al. | |
| 6,253,930 | B1 * | 7/2001 | Freidus et al. | 211/59.2 |
| 6,267,258 | B1 | 7/2001 | Wilkerson et al. | |
| 6,637,604 | B1 | 10/2003 | Jay | |
| 6,802,433 | B2 * | 10/2004 | Leykin et al. | 221/30 |
| 6,991,116 | B2 | 1/2006 | Johnson et al. | |
| 7,207,447 | B2 | 4/2007 | Medcalf et al. | |
| 7,303,095 | B2 | 12/2007 | Nagelski et al. | |
| 7,546,973 | B2 | 6/2009 | Budz et al. | |
| 7,584,854 | B2 | 9/2009 | Chandaria | |
| D604,972 | S | 12/2009 | Henry et al. | |
| 7,665,618 | B2 | 2/2010 | Jay et al. | |
| 7,681,745 | B2 | 3/2010 | Richter | |
| 7,810,672 | B1 | 10/2010 | Mason et al. | |
| 7,823,733 | B2 | 11/2010 | Futori | |
| 7,850,015 | B1 | 12/2010 | Mason | |
| 2002/0043509 | A1 | 4/2002 | Lajeunesse et al. | |
| 2004/0011751 | A1 | 1/2004 | Johnson et al. | |
| 2004/0262326 | A1 | 12/2004 | Christensen | |
| 2005/0127015 | A1 | 6/2005 | Medcalf et al. | |
| 2005/0207877 | A1 * | 9/2005 | Haverdink et al. | 414/412 |
| 2006/0081692 | A1 | 4/2006 | Stewart et al. | |
| 2006/0237384 | A1 | 10/2006 | Neumann et al. | |
| 2006/0278591 | A1 | 12/2006 | Tippets et al. | |
| 2009/0212066 | A1 | 8/2009 | Bauer | |
| 2009/0266776 | A1 | 10/2009 | Johnson | |
| 2010/0032391 | A1 | 2/2010 | Schneider et al. | |

FOREIGN PATENT DOCUMENTS

| | | | |
|---|---|---|---|
| JP | 03133737 | A | 6/1991 |
| JP | 03198192 | A | 8/1991 |
| JP | 03273469 | A | 12/1991 |
| JP | 03273470 | A | 12/1991 |
| JP | 03273471 | A | 12/1991 |
| JP | 03273472 | A | 12/1991 |
| JP | 03273474 | | 12/1991 |
| JP | 03273476 | A | 12/1991 |
| JP | 03273477 | A | 12/1991 |
| JP | 03273480 | A | 12/1991 |
| JP | 03273482 | A | 12/1991 |
| JP | 03273483 | A | 12/1991 |
| JP | 04086985 | A | 3/1992 |
| JP | 04115392 | A | 4/1992 |
| JP | 04137194 | A | 5/1992 |
| JP | 05004640 | A | 1/1993 |
| JP | 05174239 | A | 7/1993 |
| JP | 05346984 | A | 12/1993 |
| JP | 08161611 | A | 6/1996 |
| JP | 09027066 | A | 1/1997 |
| JP | 09102065 | A | 4/1997 |
| JP | 09282537 | A | 10/1997 |
| JP | 09311971 | A | 12/1997 |
| JP | 10269421 | A | 10/1998 |
| JP | 11011471 | A | 1/1999 |
| JP | 11171264 | A | 6/1999 |
| JP | 11191175 | A | 7/1999 |
| JP | 11328513 | A | 11/1999 |
| JP | 2001072076 | A | 3/2001 |
| JP | 2001206358 | A | 7/2001 |
| JP | 2003327243 | A | 11/2003 |
| JP | 2004017970 | A | 1/2004 |
| JP | 2005338910 | A | 12/2005 |
| JP | 04157593 | B1 | 10/2008 |
| WO | WO-9106076 | A1 | 5/1991 |
| WO | WO 2009138538 | | 11/2009 |

* cited by examiner

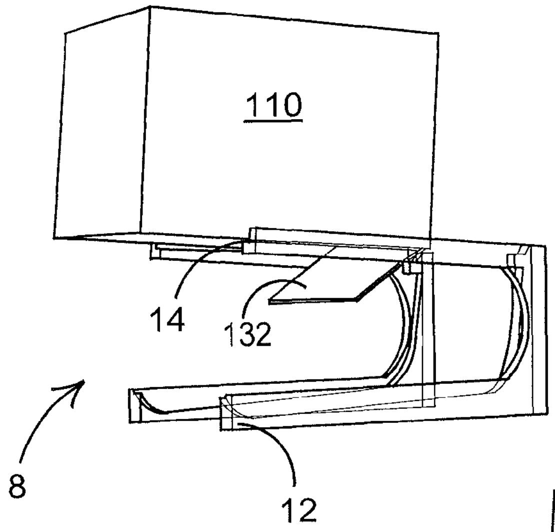
FIGURE 1A
FIGURE 1B
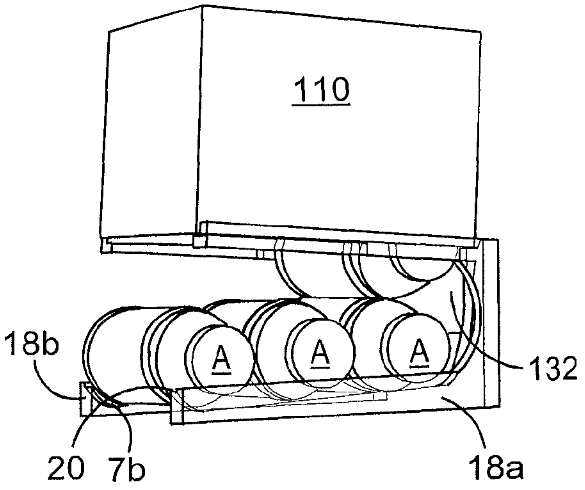
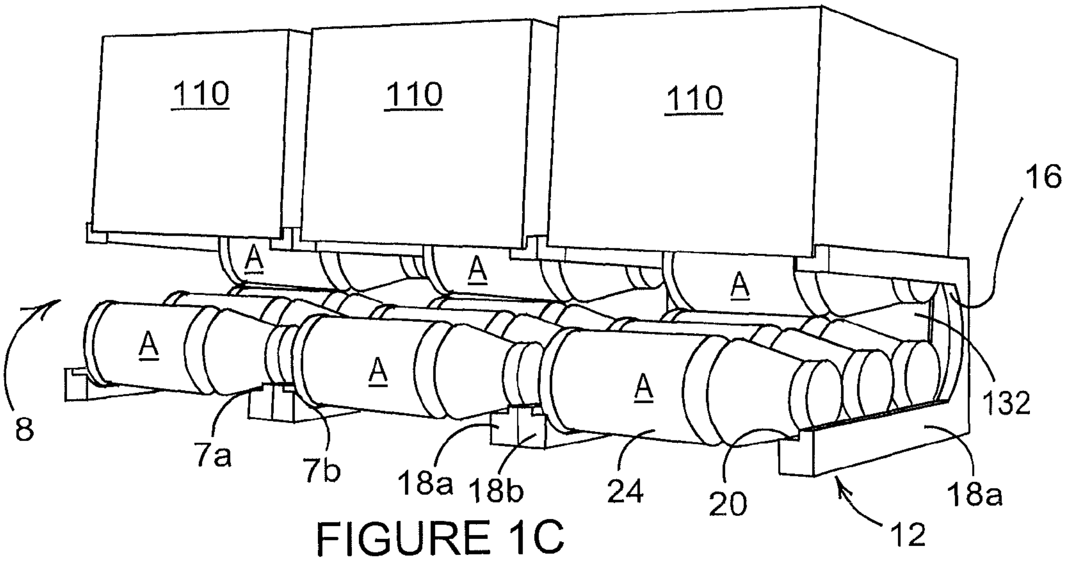
FIGURE 1C

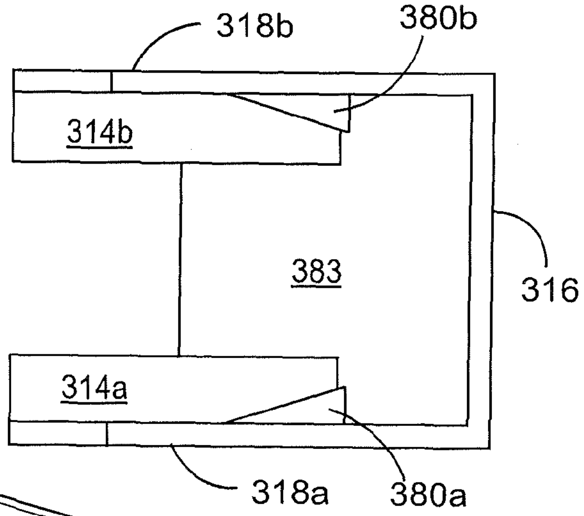
FIGURE 6A
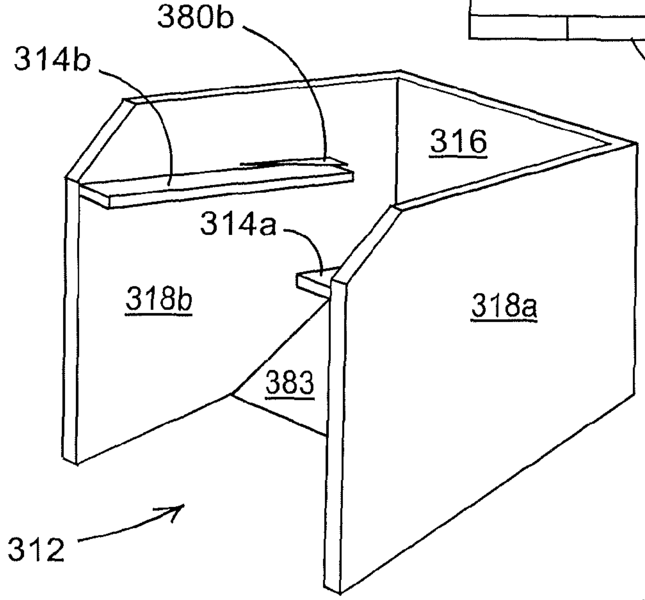
FIGURE 6B
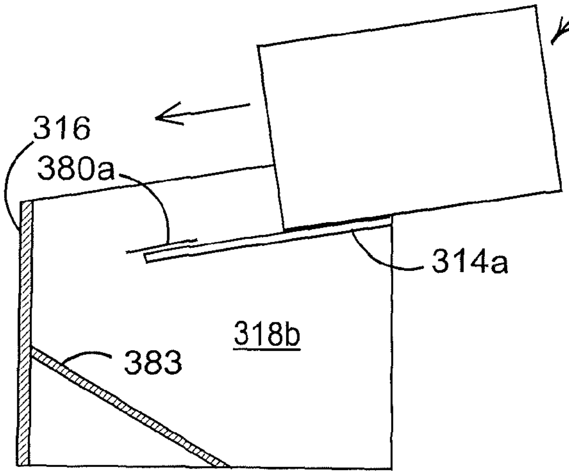
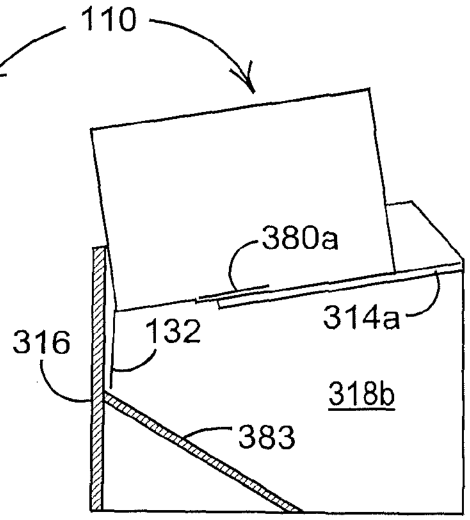
FIGURE 6C
FIGURE 6D Fig. 22
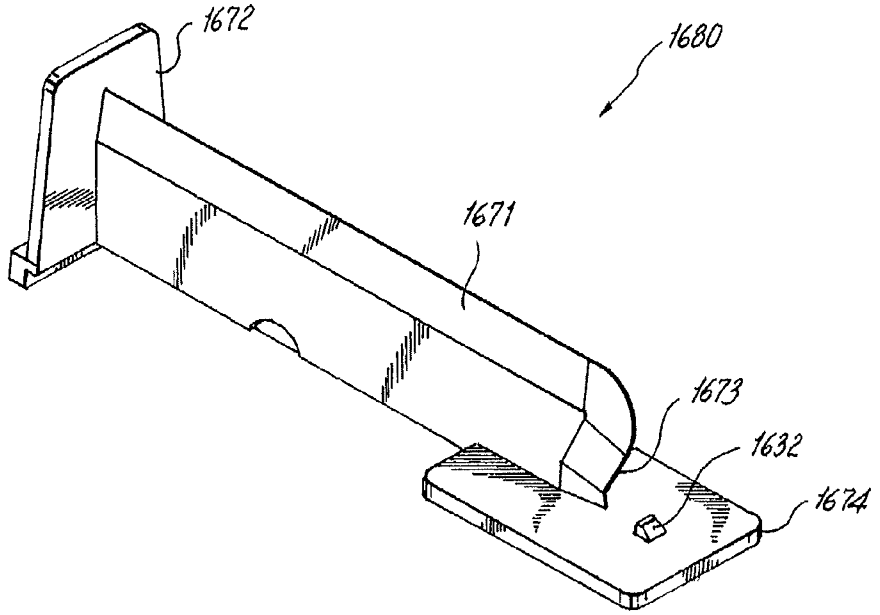
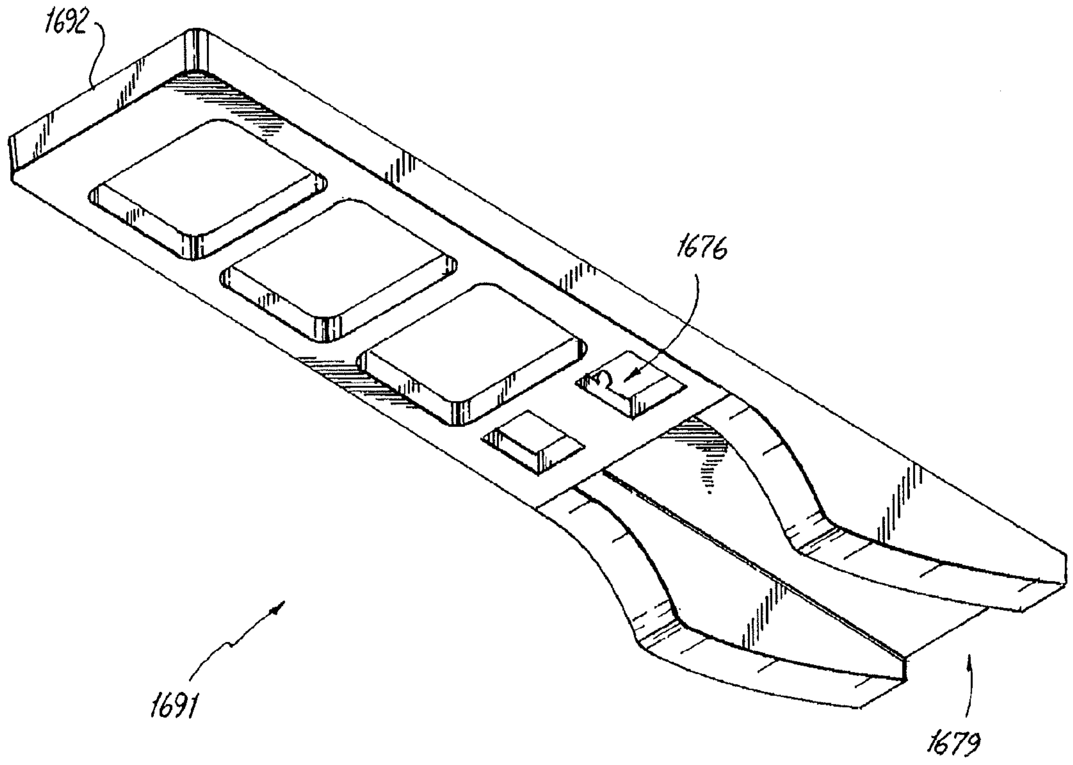
Fig. 23

Fig. 24
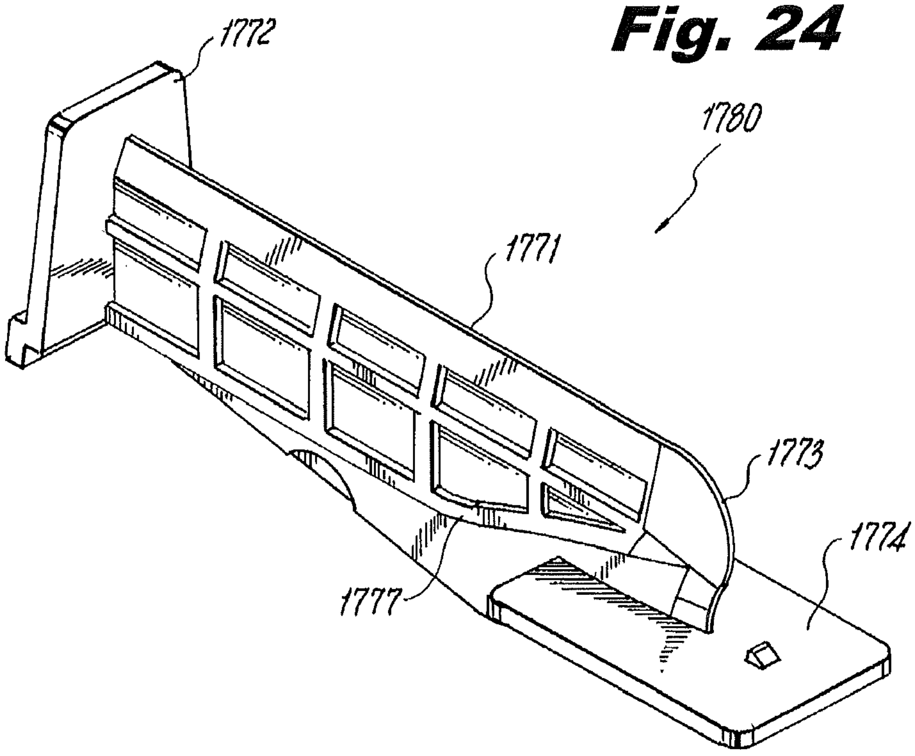
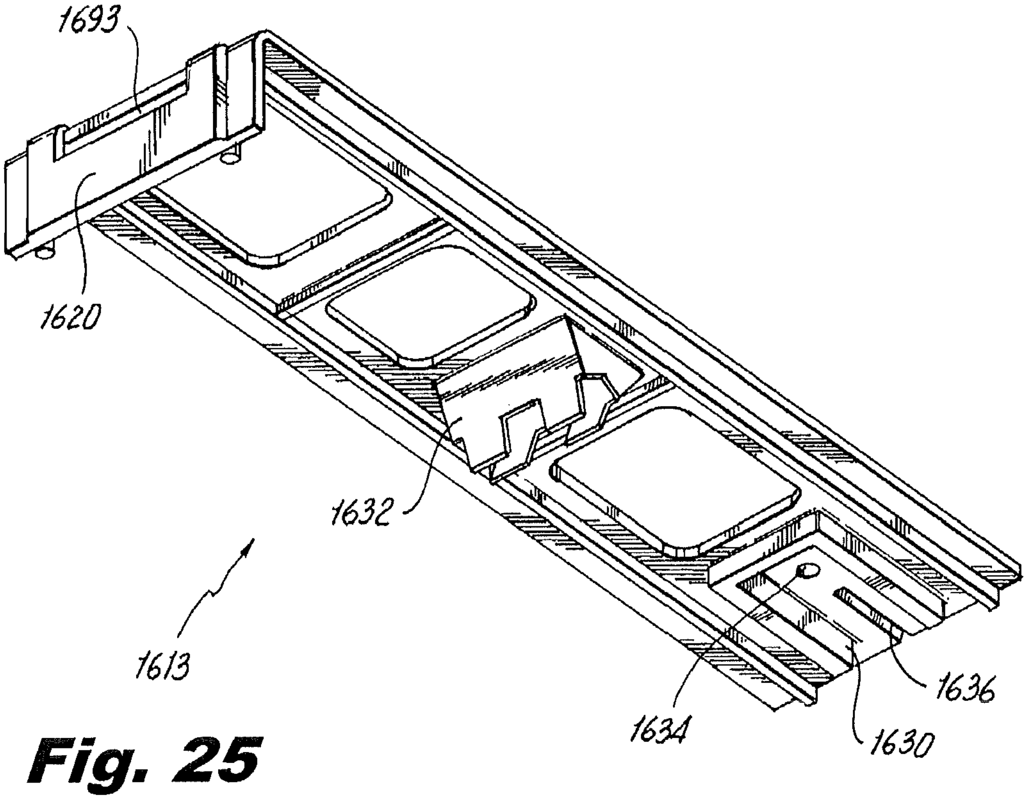
Fig. 25

DISPLAY SYSTEM, DISPENSING DEVICE AND PACKAGE FOR USE THEREIN

CROSS REFERENCE TO RELATED APPLICATIONS

This application claims priority to U.S. Provisional Patent Application Ser. No. 61/263,767, filed Nov. 23, 2009, entitled Display System, Dispensing Device and Carton for Use Therein, the disclosure of which is herein incorporated by reference in its entirety.

BACKGROUND OF THE INVENTION

1. Field of the Invention

The subject invention relates to dispensing and display devices for use in retail environments. More specifically, but not exclusively, the invention relates to a display device which includes a frame that is adapted and configured for receiving a carton or package containing a plurality of products on an upper deck of the display device and an opening tool for facilitating the opening of the carton and the dispensing of the products sequentially from the carton into a lower display area. The invention also relates to a system that includes a dispensing and display device, such as the aforementioned, and a package or carton of articles which is specially adapted for use with the dispensing and display device. The invention further relates to blanks for use in forming cartons or packages adapted for use with the aforementioned dispensing and display device.

2. Background of the Related Art

At point-of-sale (POS) or display units in retail outlets/locations it is convenient to present articles and products in an eye-catching and easily accessible manner. These POS or display units also act as a storage area for articles and products and it is therefore necessary to maximize the amount of storage space utilized, whilst at the same time enabling a customer to easily select and take products away for purchase. To achieve this, as articles are removed, it is desirable for the shelf to forward fill to present the next stored article for easy selection by a customer. Some dispensers have sprung-biased mechanisms that push articles forward; other known display devices use gravity feed mechanisms to cause articles to flow to the forward-most sale position. One such dispensing device is disclosed in U.S. Pat. No. 5,396,997 to Johnson in which a dispensing device has upper and lower jar guides and a plurality of glass jar containers are loaded on their sides through a container loading area. The dispenser racks successively feed one container at a time to the container dispensing area to thereby provide a self-feeding and self-facing storage, dispensing and display system.

A drawback of systems, such as that disclosed in U.S. Pat. No. 5,396,997 to Johnson, is that loading of the dispensing device is done manually and individually. In Johnson, a rotatable door panel is provided so that loading occurs through the openable upper jar guide. As such articles are fed one at a time into the upper jar guide. Loading in this manner is slow, and therefore, time-consuming. Additionally, the products being displayed in the dispensing device are usually transported to a retail outlet in a carton or box containing a number of such articles. Therefore, if the dispensing device is not capable of holding all of the articles contained in the delivered carton or box, then any articles that could not be loaded into the dispensing device need to be stored elsewhere in the retail outlet in the partially emptied carton or box, until such time as the dispensing device can accommodate those articles.

It is therefore desirable to improve the manner in which the filling of the dispensing devices takes place. It is desirable that the filling is quick, enables full cartons of delivered goods to be accommodated in the dispensing device and it is desirable that the requirement for storing any extra articles that cannot be displayed is avoided. It is also desirable that such dispensing devices are made from a minimum amount of material. It is also desirable that such dispensing devices are as eye-catching as possible to the customer and contain branding, advertising and/or marketing material for this purpose. Since the advertising and branding materials and graphics are frequently changed and altered in line with trends and promotions, it is also desirable that the dispensing devices are adaptable to facilitate quick changeovers in the branding, advertising and marketing graphics displayed thereon. The present invention seeks to provide improvements in the field of dispensing devices.

SUMMARY OF THE INVENTION

The subject invention is directed to a system for dispensing a plurality of products provided initially in a package that includes, inter alia, a frame and an opening tool. The frame has longitudinally opposed front and rear end sections and includes an upper support deck extending at least partially between the front and rear end sections and below which a product display area is provided.

The opening tool is associated with the frame and is arranged to open the package when the package is moved longitudinally on the upper support deck and relative to the opening tool thereby allowing the products to be at least partially dispensed from the package into the product display area.

In a preferred embodiment, the frame includes a lower display deck. Still further, it is envisioned that the frame can also include a rear wall which is configured to guide products to the product display area and/or first and second laterally opposed side walls. Preferably, the laterally opposed side walls are adapted and configured for guiding the package as it is moved longitudinally along the upper support deck.

Preferably, the upper support deck is inclined at an acute angle with respect to a horizontal plane. Moreover, the upper support deck can includes two longitudinally extending rails.

It is presently envisioned that the opening tool is attached to the upper support deck. Alternatively, the opening tool can be connected to at least one of: the upper support deck, a first lateral side wall, a second lateral side wall or a rear wall of the frame.

In certain embodiments of the present invention, the opening tool includes a first cutting element attached to the first side wall of the frame and a second cutting element attached to the second side wall of the frame. It is envisioned that the first and second cutting elements can be removably attached to the first and second side walls of the frame, respectively.

In a preferred embodiment of the present invention, the opening tool includes a centrally positioned cutting panel.

Preferably, the frame includes product related indicia.

In certain embodiments of the present invention, the package includes a paperboard carton.

The present invention is also directed to a system for dispensing and displaying a plurality of products provided initially in a package. The system includes a frame and an opening tool associated with the frame. The frame has longitudinally opposed front and rear end sections and laterally opposed side walls which extend between the front and rear end sections. The frame also includes an upper support shelf that extends at least partially between the front and rear end sections and a lower display deck for at least partially defining a product display area below the upper support shelf.

The opening tool is arranged to open the package when the package is moved longitudinally along the upper support deck of the frame from the front end section toward the rear end section. The opening of the package allows the products to be at least partially dispensed from the package into the product display area.

It is presently envisioned that the opening tool is engaged with at least one of: the upper support deck, the first lateral side wall, the second lateral side wall or a rear wall of the frame. In certain constructions, the opening tool includes a centrally positioned cutting panel.

In certain embodiments of the present invention, the frame includes a lane divider to create two display channels within the product display area.

The present invention is also directed to a method for dispensing a plurality of products which includes, among others, the steps of: providing a frame having longitudinally opposed front and rear end sections and including an upper support deck extending at least partially between the front and rear end sections and below which a product display area is provided; providing an opening tool associated with the frame; and sliding a package containing the plurality of products longitudinally along the upper support deck and relative to the opening tool so as to open the package and allow the products to be at least partially dispensed from the package into the product display area.

BRIEF DESCRIPTION OF THE DRAWINGS

So that those having ordinary skill in the art to which the present invention pertains will more readily understand how to employ the systems and methods of the present invention, embodiments thereof will be described in detail hereinbelow with reference to the drawings, wherein:

FIG. 1A is a perspective view from the front and side of a dispensing system that includes a rack/frame and a carton being loaded into the rack according to a first embodiment of the invention;

FIG. 1B is a perspective view from the front and side of the dispensing system of FIG. 1*a* with the carton fully loaded into the dispensing rack and articles having being emptied from the carton into the dispensing rack and displayed;

FIG. 1C is a perspective view from the front and side of three dispensing racks of FIG. 1B disposed in side by side relationship on a store shelf;

FIGS. 6A to 6D show top, perspective and side views respectively of a dispensing system according to a fourth embodiment of the invention, wherein the system includes two side mounted opening tools;

FIG. 22 is a perspective view of an opening tool for use with the dispensing rack of FIGS. 20 and 21;

FIG. 23 is a perspective view of a flag element used in the dispensing system of FIGS. 20 and 21;

FIG. 24 is a perspective view of a second embodiment of an opening tool for use with the dispensing rack of FIGS. 20 and 21;

FIG. 25 is a perspective view take from below of a floor member used in the dispensing system of FIGS. 20 and 21;

Figure 2:
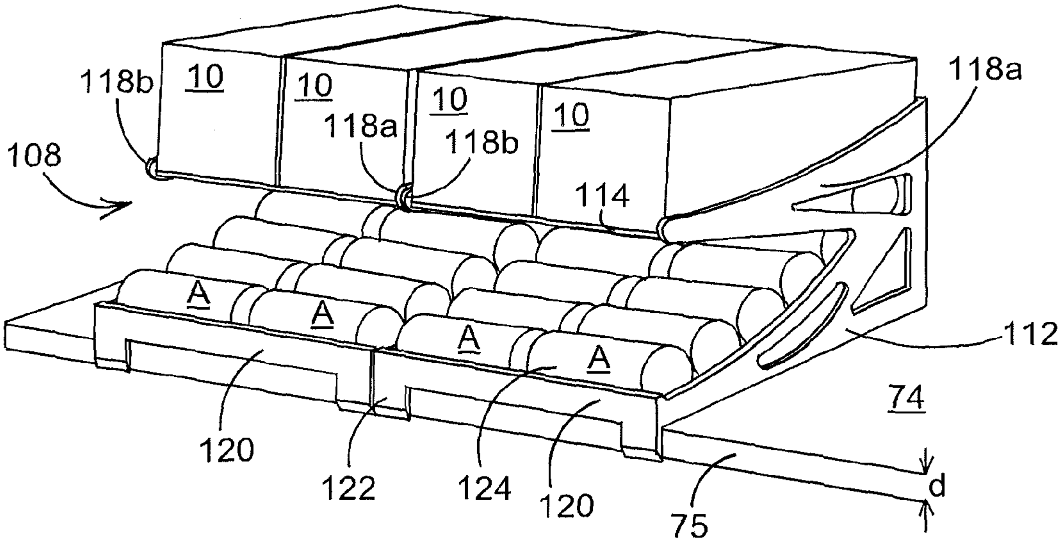
FIG. 2 is a perspective view from the front and side of two dispensing racks/frames according to a second embodiment of the invention that are disposed in side by side relationship on a store shelf with four cartons shown as having been fully loaded into the dispensing racks and articles having being emptied from the cartons into a lower track of the dispensing racks.

These and other aspects of the subject invention will become more readily apparent to those having ordinary skill in the art from the following detailed description of the invention taken in conjunction with the drawings.

DETAILED DESCRIPTION OF PREFERRED EMBODIMENTS

Disclosed herein are detailed descriptions of specific embodiments of the dispensing systems, methods and package assemblies of the present invention. It will be understood that the disclosed embodiments are merely examples of the way in which certain aspects of the invention can be implemented and do not represent an exhaustive list of all of the ways the invention may be embodied. Indeed, it will be understood that the systems, devices, methods and package assemblies described herein may be embodied in various and alternative forms. The figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Referring now to FIGS. 1A, 1B and 1C, shown therein is a display and dispensing system or in the case of FIG. 1C, three display and dispensing systems disposed side-by-side. The display system comprises a dispensing device or dispensing rack 8 and a package or loaded carton 110. The carton 110 (shown in more detail in FIGS. 5A to 5E) contains a plurality of articles A. In this example, the articles are bottles arranged in a 3×4 array with each bottle disposed upon their sides with the lowermost row in rolling contact with a base 136 of the carton 110.

The dispensing device comprises a frame 12 including an upper deck or upper level 14 which supports the carton 110 from its base 136. The frame 12 comprises sides 18*a*, 18*b* which define upper and lower levels and which guide the carton 110 along the deck or upper level 14 and which serve to guide articles A along the lower level, once released from the carton 110, toward a front end of the frame 12. The sides 18*a*, 18*b* are formed with grooves or railings 7*a*, 7*b* in which a lower rim and upper rim of each article A is guided.

The articles A are released from the carton 110 via an access means or trap door 132. The access means or trap door 132 can be moved from a closed position, wherein the articles A are securely retained within the carton 110, to an opened position, wherein the trap door 132 is moved out of the plane of the base of the carton 110 to create an access opening, through which articles A held within the carton may fall free of the carton 110 and onto the dispensing device 8, where they are guided, one-by-one, by the grooves 7*a*, 7*b* in the lower level sides 18*a*, 18*b* toward the front end of the frame 12. Preferably, the access means or trap door 132, is not moved into a fully open position until the carton 110 is fully installed or nearly fully installed on the upper level 14 of the dispensing device 8.

The access means or trap door 132 is moved into its open position by an opening tool (not shown in FIGS. 1A to 1C) disposed on the frame 12. The opening tool is co-operable with the access means of the cartons and engages perforations 158*a*, 156*a* which define the trap door 132 as the carton 110 is installed by sliding movement along the supporting ledges at the upper level 14. Once the carton 110 is so installed and the opening created, the articles A are automatically released from the carton 110 and into the lower level of the frame 12.

The articles A are successively released from the carton 110 with the assistance of gravity. The upper level or deck 14 is angled or inclined relative to the plane of the lower level of the frame 12 to encourage the articles A in the carton to gently roll toward the opening in the carton 110. A scoop shaped or arcuate back portion 16 of the dispensing device 12 prevents the articles from rolling out of the frame 12 and beneficially encourages the articles, by providing a path for them to follow, to roll around and down onto the lower level of the frame 12. The gravity feed mechanism causes the articles A to be supplied automatically to the front of the lower level of the frame 12. A stopping mechanism 20 formed as an upturned or radiused portion of grooves 7*a*, 7*b* (provided on each lower side 18*a*, 18*b*) prevents the front-most article A, contained in dispensing position 24, from rolling completely out of the frame 12. The stopping mechanism 20 acts to retain the articles A within the lower level of the frame 12.

In FIG. 2 a second embodiment of the display system is illustrated in which two dispensing devices 108 are shown. Each dispensing device 108 is wide enough to receive two cartons 10, disposed in side-by-side relationship on the deck or upper level 114 (or alternatively one double width carton) of the respective frame. The cartons 10 are guided into the upper level 114 by means of the cartons fitting closely and slidably between side walls 118*a*, 118*b* which extend alongside both the upper and lower level of the frame 112. The extended side walls 118*a*, 118*b* also help to guide the articles A as they are emptied from the cartons 10 toward a stopping mechanism 120 provided as a front edge or front lip integrally formed with the sides 118*a*, 118*b* of the respective frame 112. The front edge 120 is optionally integrally formed with a shelf fixing device 122 to enable the dispensing device 108 to be secured to a shelf 74 in a store or retail outlet. The shelf fixing device 122 is formed as an extension of the stopping device 120 and extends as a clip with the stopping device or front lip 120. The shelf fixing device 122 has a 'C' shaped (or square-'C' shaped) cross-section which fits on top of the shelf 74, down the front-edge or front face 75 of the shelf 74 and underneath the shelf 74. The shelf fixing device 122 has a depth 'd' approximately equal to the depth of the shelf 74 (as illustrated by the front edge 75 and reference 'd' in FIG. 2).

The frame 112 does not necessarily comprise a bottom portion, but rather the shelf 74 may provide a surface onto which the dispensed lower level articles A can rest. The frame 112 comprises a ramp (not shown) to encourage the articles rolling out of the carton 10 to roll toward the stopping mechanism or front lip 120. A back portion of the frame (also not shown) provides structural support to the frame 112 as well as a rear stopping device to prevent articles exiting the carton from rolling free of the rear of the frame 112. The sides 118*a*, 118*b* are shaped to follow the path of the rolling articles in the lower level. The deck or upper level 114 is inclined downward and backward to encourage rolling of the articles toward the dispensing position 124 (the position of the front most article that will be picked out first by a customer).

The principle of operation of the display system of FIGS. 1A to 1C and FIG. 2 is similar to the principle of operation of the various display and dispensing systems to be herein described with reference to the remaining FIGS. 3A to 19B. The carton 110 provides a single and ordered collection or a magazine of articles A that is easy to handle and manipulate. The carton 110 is loaded onto and guided by an upper level of the frame 12 and as such a full set of articles A is loaded in one single operation into the dispensing device 8. The dispensing device 8 comprises an opening tool which is operable in-conjunction with a complimentary formed access means 132 provided on the carton 110. As the carton is loaded into the dispensing device 8 or 108, the opening tool engages or interacts or manipulates the access means or trap door 132 of the carton 110 to create an access opening in the base 136 of the carton 110 through which the articles A are (preferably) individually released into the lower level of the frame 12. The dispensing device is thereby stocked and articles A are either stored in the carton 110 for subsequent dispensing into the device 8 or the articles A are displayed in the lower level of the frame 12 for retrieval by a customer. Upon removal of the front most article A, a forward feed mechanism causes automatic replenishment of the lower level and front most position of the lower level of the dispensing device 8 from the supply of articles A contained in the carton 110. Once the carton 110 is empty, the empty carton 110 can be removed from the dispensing device (simply by lifting out or by sliding withdrawal along the upper level or deck 14) and replaced by a new one. When the last article A drops out of the carton 110, the lower level of the dispensing device may be full. This means that the front-most article location 124 contains an article A and as such the display and presentation of articles for being picked by a customer is in its optimum position.

The carton 110 remains on the upper level even after it has been emptied, to serve as billboard panel. To this end the carton 110 and its front end wall in particular may be printed with graphics including trademarks and/or any other advertising indicia. However, the carton 110 may be replaced by a new one, as soon as it is emptied, to mitigate the chance that an article A will be taken from the lower level of the frame 12 before a fresh supply of articles is available to replenish the lower level and the front-most position 124. The need for any secondary storage of articles contained in the carton but not displayed by the dispensing device is mitigated by the loading of only completely full cartons onto the dispensing device.

In view of the fact that the principle of operation of the display and dispensing systems of later embodiments is the same or similar to that of the first display and dispensing systems described above, in the foregoing description of later embodiments only differences and additional technical features will be described in greater detail.

In FIGS. 3A to 3D a first carton embodiment is shown, which carton is co-operable with the dispensing racks of FIG. 2 and FIGS. 4A to 4D. In FIGS. 5A to 5E, a second carton embodiment is shown, this carton is co-operable with the dispensing device 8 of the first embodiment in FIGS. 1A to 1C; the dispensing device of the fourth embodiment shown in FIGS. 6A to 6D; the dispensing device of the fifth embodiment of FIGS. 7A to 7C; and a dispensing device utilising the variant retractable cutting tools shown in FIGS. 10A to 10D. In FIGS. 8A to 8C, a third carton embodiment is shown, which carton is co-operable with the dispensing device of the fifth to ninth embodiments of FIGS. 9A to 13G.

In the various embodiments illustrated like reference numerals have, where possible been used to denote like features generally albeit with a different numerical pre-fix ('100', '200' '1000' etc.) to distinguish the different embodiments from one another. For example, the cartons of the first, second and third carton embodiments depicted in FIGS. 3B, 5B and 8B are numbered as 10, 110 and 210 respectively.

Figure 3A:
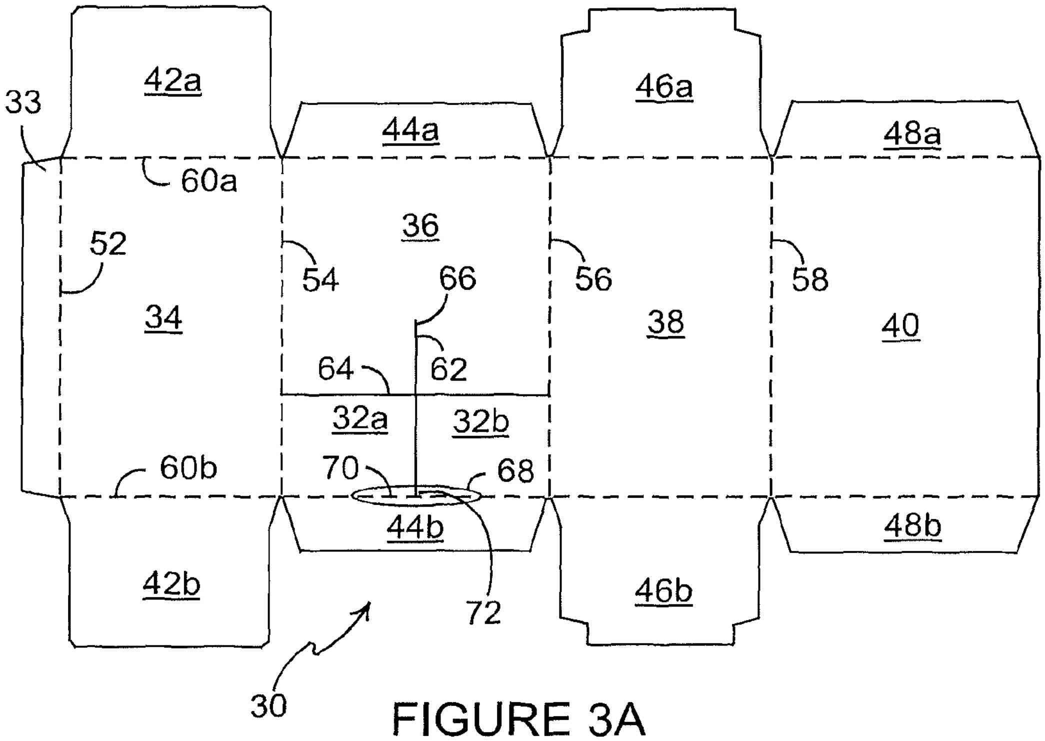
FIG. 3A is a blank for forming a carton or package according to a first carton embodiment, as illustrated in FIGS. 3B to 3D, the first embodiment for use with dispensing racks or frames such as those illustrated in FIG. 2 and FIGS. 4A to 4C.
Figure 3B:
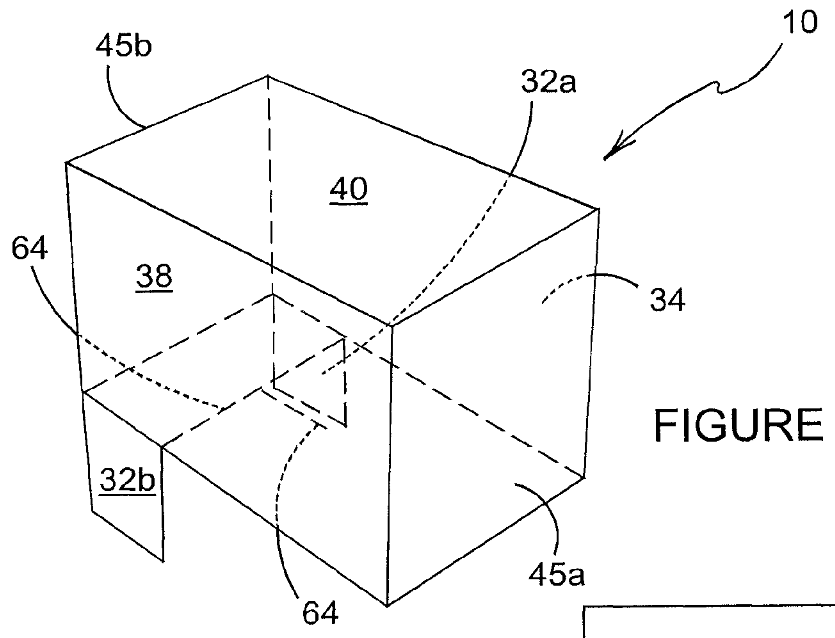
FIG. 3B is a transparent perspective view from the front and side of a carton formed from the blank of FIG. 3A wherein bottom opening flaps have been opened.

Turning now to FIG. 3A, there is shown a blank 30 formed from paperboard. The blank 30 is generally for a known type of fully enclosed end loading style carton and comprises: a top panel 40, first side panel 38, bottom panel 36, second side panel 34, glue flap 33 and end closure panels 42*a*, 44*a*, 46*a*, 48*a*, 42*b*, 44*b*, 46*b*, 48*b*. The main panels (the top panel 40, first side panel 38, bottom panel 36 and second side panel 34) are hinged one to the next in series along fold lines 58, 56 and 54 respectively. The glue flap 33 is connected to the second side panel 34 along fold line 52. The end closure panels 42*a*, 44*a*, 46*a*, 48*a*, 42*b*, 44*b*, 46*b*, 48*b* are hinged to opposite ends of the main panels along fold lines 60*a* and 60*b* respectively.

The blank 30 is foldable into a part formed blank where the glue flap is secured to the inner face of top panel 40 and the top panel 40 and first side panel 38 have been folded into overlapping face contacting relationship with the first side panel 38 and bottom panel 36. The part formed blank (not illustrated) is openable into an open ended tubular structure and loaded from one or both ends with articles A. The end closure flaps 42*a*, 44*a*, 46*a*, 48*a*, 42*b*, 44*b*, 46*b*, 48*b* are foldable and securable (using adhesive or other suitable securing means including mechanical fastenings) to form a composite front end wall 45*a* and a composite rear end wall 45*b* respectively (see FIG. 3B). In this way, a fully formed and loaded carton that secures articles therein is formed.

Figure 5A:
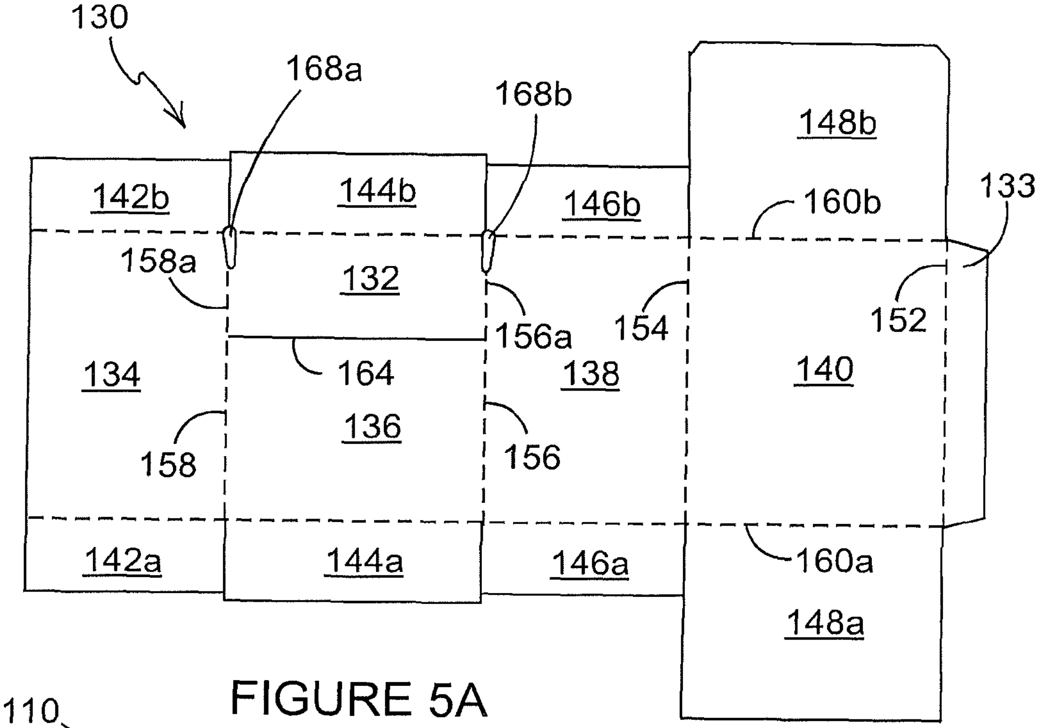
FIG. 5A is a blank for forming a package or carton according to a second carton embodiment, which carton is suitable for use with dispensing systems shown in FIGS. 1A-1C, FIGS. 6A to 6C and FIGS. 7A-7C.
Figure 5B:
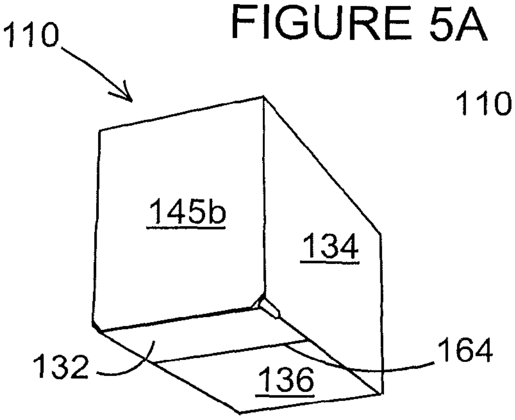
FIGS. 5B to 5E show perspective views and a side view respectively of a carton formed from the blank of FIG. 5A having an access means positioned to the rear of the bottom panel of the carton.
Figure 5C:
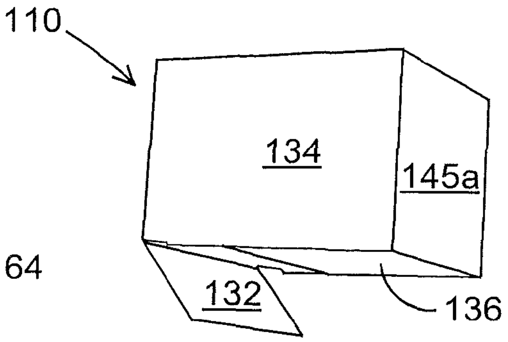
Figure 5D:
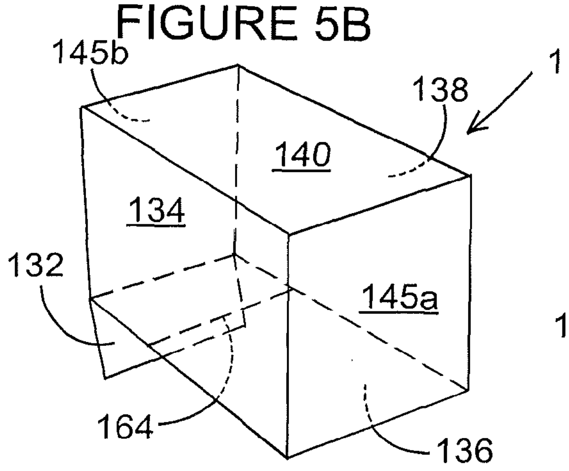
Figure 5E:
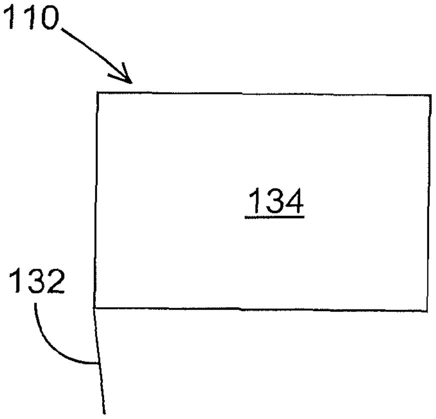

The blanks 130, 230 for forming cartons 110, 210 according to the second and third carton embodiments shown in FIGS. 5A and 8A have the same basic structure as that described in the preceding paragraph with respect to blank 30 of the first carton embodiment. Therefore, in later paragraphs when these blanks 230, 330 are further described, only the differences between the bottom panel 36, 136, 236 access structures 32*a*/32*b*, 132, 232 will be discussed in detail.

Turning now to the bottom panel 36 access structure or opening mechanism 32 of the first carton embodiment 30, there is provided in bottom panel 36 a pre-formed weakened arrangement or series of perforations, folds and cut lines for creating an access opening. Toward the rear end of bottom panel 36 a transverse cut line or severance line 64 is provided. This cut line 64 defines in part each of two access panels or trap doors 32_a_, 32_b_. The trap doors 32_a_, 32_b_ are further defined by a longitudinal cut line or second severance line 62 extending medially along the bottom panel 36, from the first severance line 70 adjoining end flap 44_b_ to the bottom panel 36, between the two access panels 32_a_, 32_b_, across the cut line 64 and terminating approximately half way along the bottom panel 36 at end point 66. The start of longitudinal cut line 66 is positioned on the first severance line 70 (denoted by reference 72 in FIG. 3A). A perforation 68 is defined about a portion of that fold line 70. The perforation 68 defines an elliptical weakened piece or severance initiation area that extends into end flap 44_b_ and into bottom panel 36.

To open the access panels 32_a_, 32_b_, the severance line 64 is broken first. Then, the severance initiation area, defined by perforation 68, is presses inwardly of the carton. This is assisted by the presence of the starting end 72 of longitudinal cut line 62. Once the severance initiation area 68 is broken, the remainder of the severance line 70 on the opposite sides of the area 68 and the severance line 66 are completely broken to allow access panels 32_a_, 32_b_ to fold downwardly from the bottom panel 36 about fold lines 54 and 56 respectively. The open position of the carton 10 is shown in FIG. 3B. Optionally, severance lines 62, 64 are severance-assisting lines that are not significantly weakened but can be broken by means of a cutting tool. In this way the bottom panel 36 retains its structural strength during the time the carton 10 acts as a secure packaging means for transporting and protecting the articles A contained therein. However, once opening of the carton 10 is required, the severance-assisting lines 62, 64 are easily broken to gain access to the articles A.

Figure 3C:
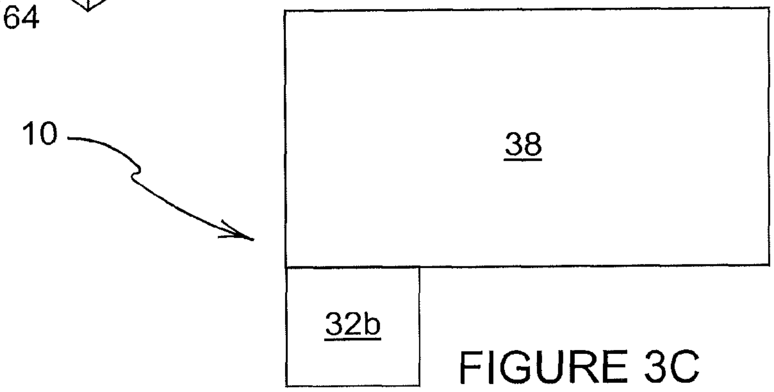
FIG. 3C is a side view of the carton/package of FIG. 3B.
Figure 3D:
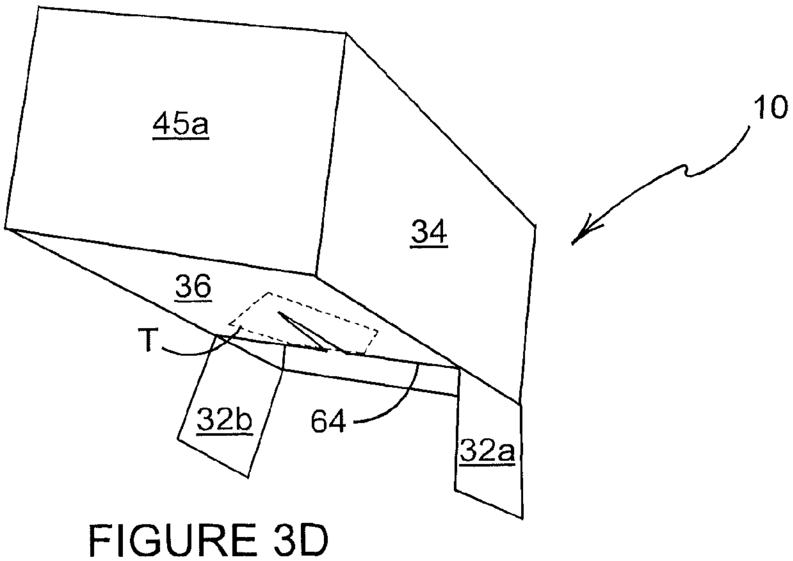
FIG. 3D is a perspective view looking at the bottom of the carton of FIG. 3B, also showing in dotted outline, the final position of an opening tool of the dispensing system of FIGS. 4A to 4C.
Figure 4A:
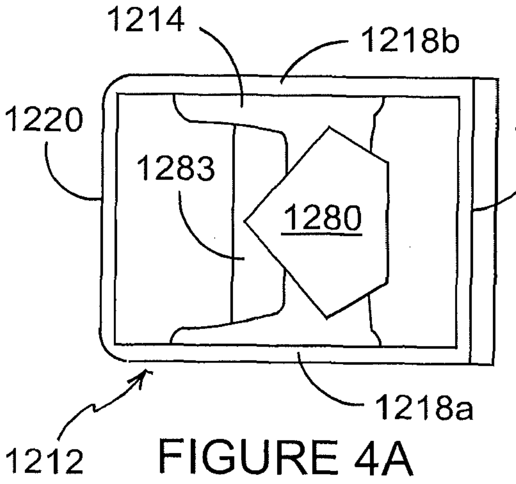
FIGS. 4A to 4C show top, side and perspective views respectively of a dispensing system according to a third embodiment of the invention having a trowel shaped opening tool.
Figure 4B:
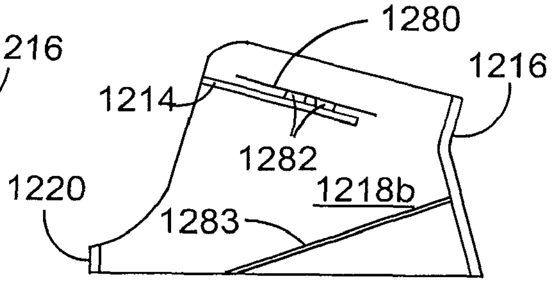
Figure 4C:
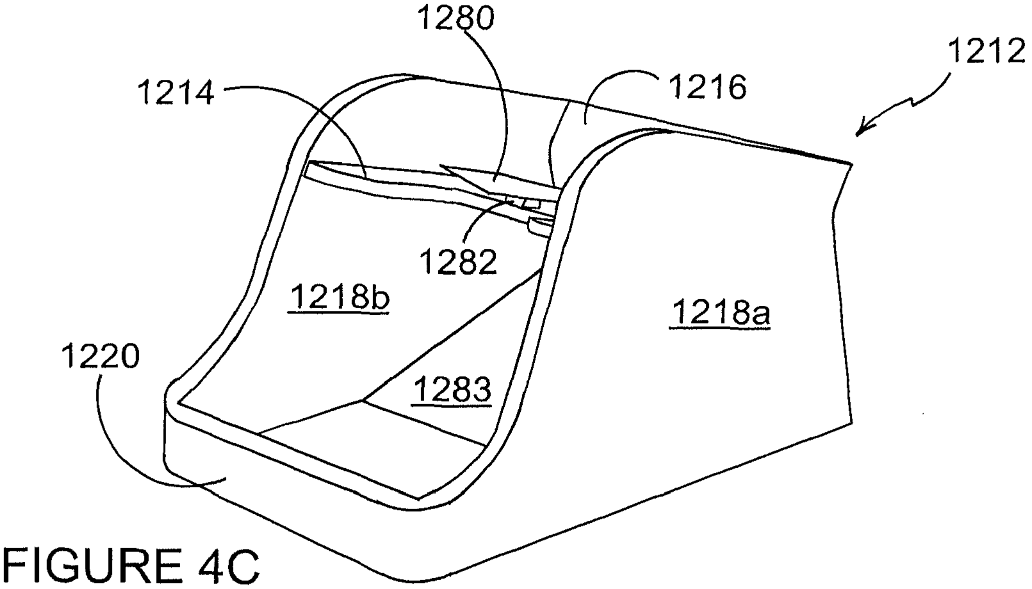

Further views of the open carton 10 are shown in FIG. 3C and FIG. 3D. In FIG. 3D, an outline of a cutting tool or opening device "T" of the dispensing device 1212 of FIGS. 4A-4C is shown in dotted outline to illustrate the final position of that opening device 1280 once a carton, such as carton 10, has been installed in the dispensing device 1212 of FIGS. 4A-4C. The dispensing device 1212, is an example of a device suitable for co-operative use with the carton 10 having access means 32_a_, 32_b_. This dispensing device 1212, is now described in further detail with reference to FIGS. 4A and 4B.

Dispensing device 1212 is preferably formed of lightweight, yet suitably strong plastics material; however, it may be formed from other material such as plastic-fiber composite material, metal, wood, ply wood, etc. The dispensing device 1212 comprises side walls 1218_a_, 1218_b_ and a front stopping mechanism 1220 adjoined thereto and a back wall 1216 also adjoined to the side walls 1218_a_, 1218_b_ in a sturdy frame like structure. The dispensing device 1212 optionally does not have a base. Once installed at a point of sale unit, the store shelf will provide the base onto which dispensed articles can be placed.

The dispensing device comprises a ramp 1283, preferably formed as an integral component of the dispensing device and a deck or carton support member 1214 onto which a carton (such as carton 10) can be disposed. The ramp 1283 extends from the back 1216 toward the plane of the lowest level of the side walls 1218_a_, 1218_b_, back 1216 and stopping mechanism 1220. The ramp 1283 is formed as a single, solid unitary extension of the back 1216 and encourages rolling of dispensed articles A toward the front dispensing position. Front stopping mechanism 1220 (provided as a solid wall of material) prevents those articles from undesirably rolling free of the dispensing device 1212. The forward feeding mechanism or ramp 1283 and front stopping mechanism 1220 in other embodiments are provided as a track and/or framework rather than a solid wall of material.

In addition the dispensing device comprises a cutting means or cutting tool (also referred to as an opening mechanism or package opening tool) 1280 formed of plastic or metal that is shaped in a "trowel" like manner having five-sides with a pointed front portion (see FIG. 4A for top view of opening device 1280). The opening tool 1280 is mounted on the deck 1214 and further comprises one or more (in the illustrated embodiment, two) keel elements the forward one of which is a cutting element 1282. The keel elements 1282 are disposed as vertical extensions from the planar "trowel". The forward keel element provides a further cutting blade or cutting means for opening a carton, such as carton 10.

From the side view of FIG. 4B in conjunction with FIG. 3C, it will be understood that as the carton 10 is slidably loaded or installed onto carton deck 1214, feeding the rear-end composite wall 45_b_ first, that the pointed portion or leading edge of the opening device 1280 is inserted into the opening defined by severance initiation area 68. In this way as an operator pushes the carton along the deck 1214 toward the back 1216 of the dispensing device 1212, the opening tool 1280 is pushed further into the carton 10 between the bottom wall 36 and the lowest most row of articles A. The diverging or widening shape of the opening tool 1280 causes the severance lines or perforate lines 70 on either side of the severance initiation area 68 to break.

When the carton 10 is pushed further and comes into contact with the keel elements 1282, these elements assist the breaking, or cutting open of severance line 62 and the separation of the two access panels 32_a_, 32_b_. The keel structures 1282 also may help to encourage the access panels 32_a_, 32_b_ to fold either side of the keel elements 1282. The opening operation may be assisted by the weight of the articles held in the carton sitting on the weakening bottom wall 36. The downward force of their weight applying additional pressure to help the opening of the access means 32_a_, 32_b_. For example, the severance line 64 may be designed such that it can automatically break due to the weight of the articles as the other severance lines 70 and 62 are broken. Otherwise, the severance line 64 may be manually broken prior to the placement of the carton onto the dispensing device.

The overall size of the opening device 1280 is such that the opening device 1280 provides, itself, a stop to prevent articles dropping through the bottom of the carton, until the carton has been further installed into the dispensing device 1212. As the opening created by the downwardly folded access panels 32_a_, 32_b_ clears the opening tool 1280, the opening becomes clear of obstruction and available for the dispensing of articles. The position of the cutting device 1280 relative to the bottom panel 36 and access means 32_a_, 32_b_ once the carton 10 has been fully installed in the dispensing device 1212 is shown in FIG. 3D. It can be seen that the substantially rectangular opening created by the opening of the trap doors 32_a_, 32_b_ is further to the rear of the dispensing device 1212 and articles disposed above that opening will fall from the carton down a notional vertical shaft and onto the lower tier or lower track provided between side walls 1218_a_, 1218_b_ and guided by the forward feeding mechanism or ramp 1283. The lower tier between side walls 1218_a_, 1218_b_ and back 1216 and stopping mechanism 1220 provides a gravity feed track into which the articles A can roll.

Figure 4D:
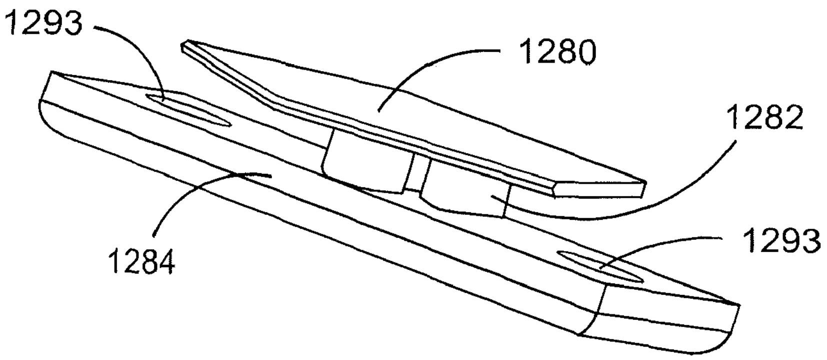
FIG. 4D shows a perspective view of the trowel shaped opening tool used in the dispensing system of FIGS. 4A to 4C.

The package opening tool or cutting element 1280 is shown in FIG. 4D in a perspective illustration from the front of the package opening device 1280. The package opening tool is optionally mounted by means of the vertical cutting structures 1282 onto a platform 1284. The platform 1284 comprises fixing means 1293, which take the form of screw retaining holes, through which screws are used to attach the platform 1284 directly onto the deck 1214. The platform 1284 is optional, in other envisaged embodiments, the package opening device or cutting element 1280 is integrally formed with the supporting element 1214. The fixing means 1293 is also optional, but where present may take many and various forms including mechanical fastenings such as nails, pins, clips, nuts, tape, bindings as examples or chemical bonding such as glue adhesive, plastic weld, heat melt glue as examples.

Referring now to FIG. 5A, the second carton embodiment disclosed therein comprises an access opening means or trap door 132 defined by a transverse severance line 164, opposed pairs of severance lines 156*a*, 158*a* and the portion of fold line 160*b* between rear end closure flap 144*b* and bottom panel 136. The carton also comprises a pair of severance initiation areas in the form of apertures 168*a*, 168*b* (which in other embodiments take the form of weakened corner portions rather than apertures or holes as such). The package opening tools of suitably formed dispensing device can engage the package 110 formed from blank 130 by first being inserted into the pair of opening apertures 168*a*, 168*b*. Exemplary dispensing devices that are co-operable with the carton 110 or co-operable with similar cartons for example cartons having weakened corner portions rather than apertures 168*a*, 168*b* are shown in FIGS. 6A to 7C.

Referring to the dispensing device 312 illustrated in FIGS. 6A to 6D, the dispensing device comprises a pair of opposite side walls 318*a*, 318*b* adjoined by a back 316. The side walls 318*a*, 318*b* define in part a track and a deck above the track. The deck is further defined by pairs of deck elements or supporting ledges 314*a*, 314*b* onto which a carton/package 110 can be positioned. The dispensing device also comprises a forward feeding mechanism 383 provided in the form of an inclined ramp extending from the back 316 toward a plane containing the lowest plane of the sides 318*a*, 318*b* and hence toward to the lowest plane of the lower track. The deck elements 314*a*, 314*b* are preferably inclined to encourage articles A in the carton 110 to roll toward the rear-end of the carton 110. A pair of cutting elements in the form of cutting fins 380*a*, 380*b* is provided in vertical alignment with the deck elements 314*a*, 314*b* respectively. The cutting fins 380*a*, 380*b* are substantially planar elements and are disposed in substantially parallel alignment with the deck elements 314*a*, 314*b*. This means that where the deck elements 314*a*, 314*b* are inclined the cutting fins 380*a*, 380*b* are preferably similarly inclined. In other embodiments, the deck elements 314*a*, 314*b* may not be disposed in vertical alignment with the cutting fins 380*a*, 380*b*, for example where the deck elements 314*a*, 314*b* extend from the back 316 (substantially centrally of the dispensing device 312) and the cutting fins 380*a*, 380*b* extend from the sides 318*a*, 318*b*.

The cutting fins 380*a*, 380*b* are, in this illustrated example, triangular in shape. The tapered shape of the cutting fins 380*a*, 380*b* enables the carton 110 to be gradually pushed onto the cutting fins 380*a*, 380*b* as the carton 110 is installed or loaded into the dispensing device 312 by sliding the bottom 136 of the carton along the deck elements 314*a*, 314*b*. The pointed narrowest portion of each cutting fins 380*a*, 380*b* is inserted into the severance initiation opening 168*a*, 168*b*. As the carton 110 is further installed into the device 312, wider portions of the tapered cutting fins 380*a*, 380*b* are pushed into and through the opening apertures 168*a*, 168*b* progressively breaking the severance lines 158*a*, 158*b*. Once the severance lines 158*a*, 158*b* are completely broken, the access panel 132 can fold downwardly (encouraged by the weight of the articles disposed in the carton above the access panel) thereby the cutting fins have engaged the package 110 to create an opening in the package through which articles are dispensed into the lower tier or lower track of the rack 312. It should be appreciated that the severance line 164 may be designed such that it cab break automatically as due to the weight of the articles in the carton as the severance lines 156*a* and 158*a* are broken. Otherwise, the severance line 164 may be manually pre-broken before the carton 110 is place on the dispensing device 312.

It will be understood by the reader, having read the foregoing description of cutting fins 380*a*, 380*b*, that other shapes of cutting fins are suitable for achieving breaking of a weakened portion of a carton and that many variations of carton and cutting element can be used in implementing the present invention. For example the leading portion of the cutting element may be squared off, rounded, pointed, angled; the taper angle of the cutting elements may be many, the pair of cutting elements 380*a*, 380*b* may not be symmetrical, the cutting elements 380*a*, 380*b* may not be triangular.

Figure 7A:
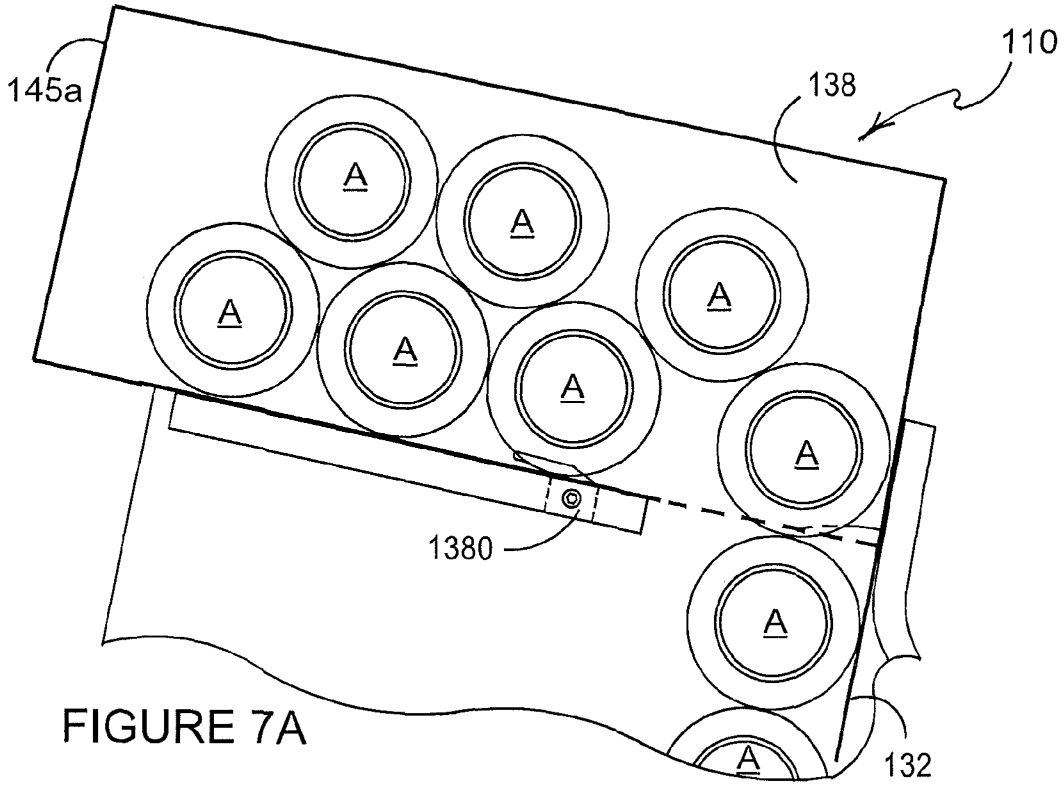
FIGS. 7A to 7C show side and top views of a dispensing system, including a rack and an opening tool, which has been constructed according to a fifth embodiment of the invention.
Figure 7B:
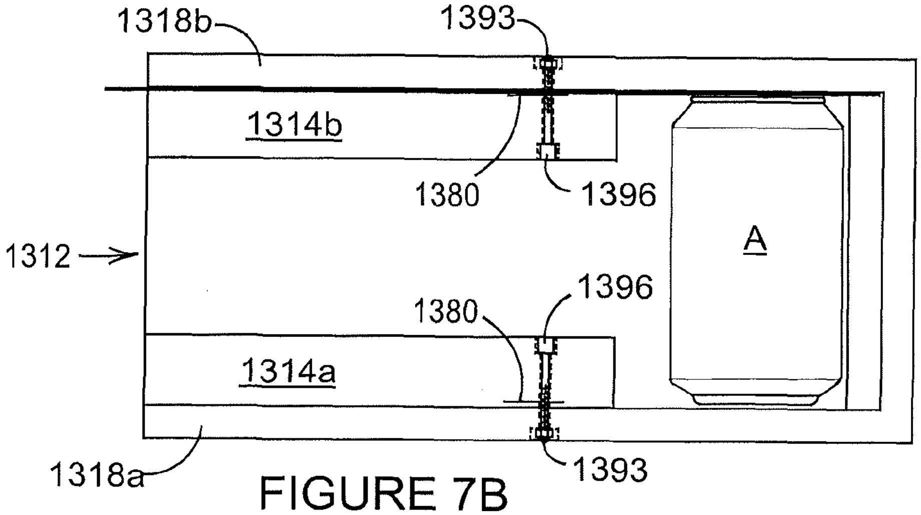
Figure 7C:
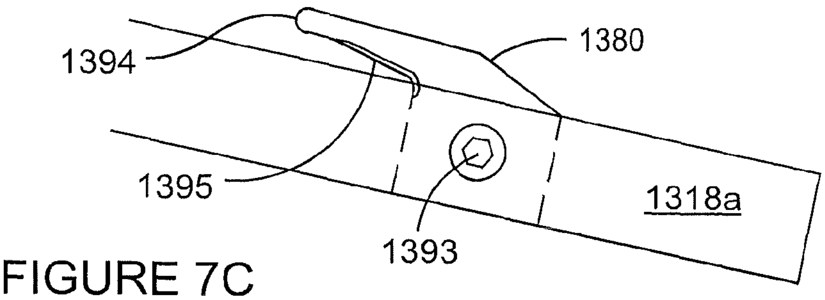
Figure 8A:
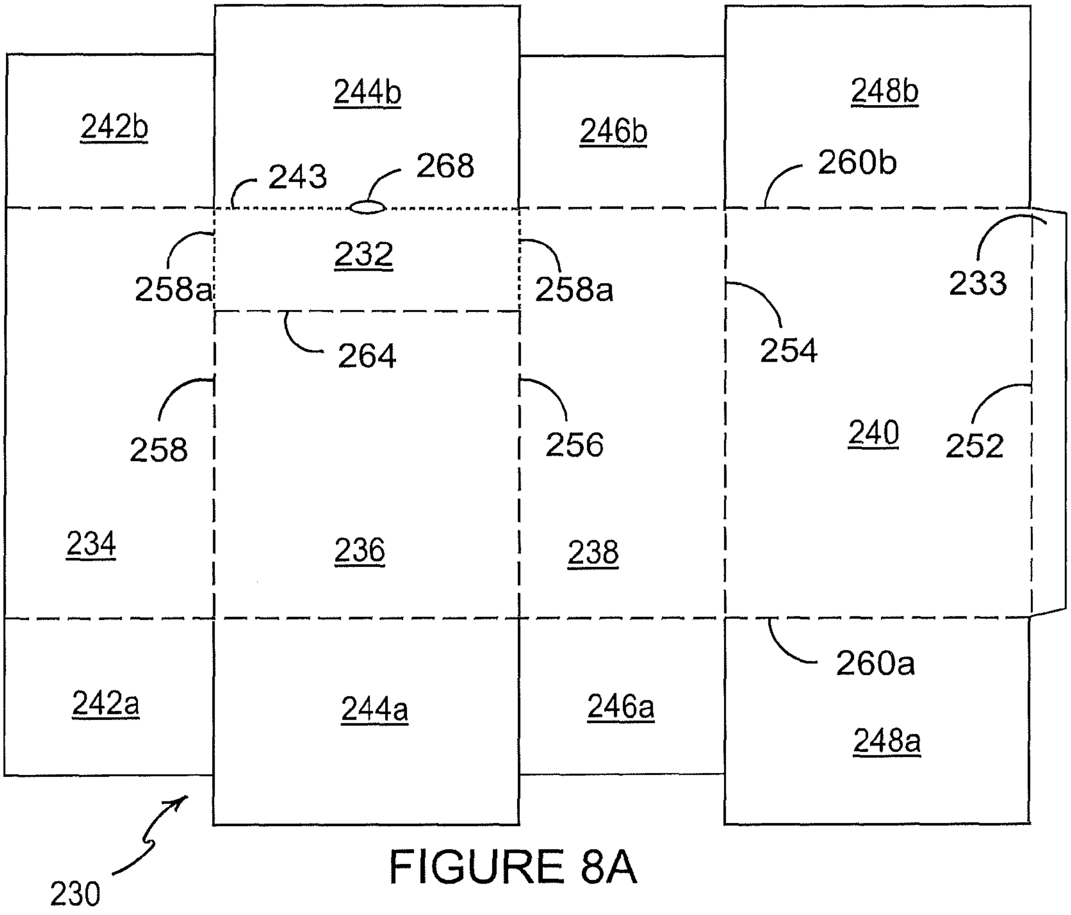
FIG. 8A is a blank for forming a carton or package according to yet a third carton embodiment of the invention, which carton is suitable for use with dispensing systems shown in FIGS. 9A to 13C.
Figure 8B:
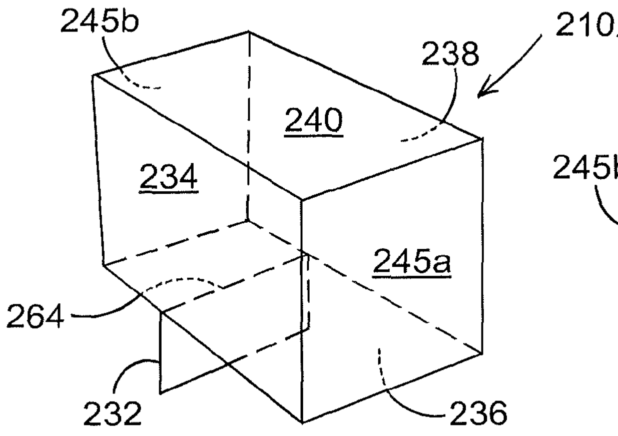
FIGS. 8B and 8C show a transparent perspective and side view respectively of the package formed from the blank of FIG. 8A.
Figure 8C:
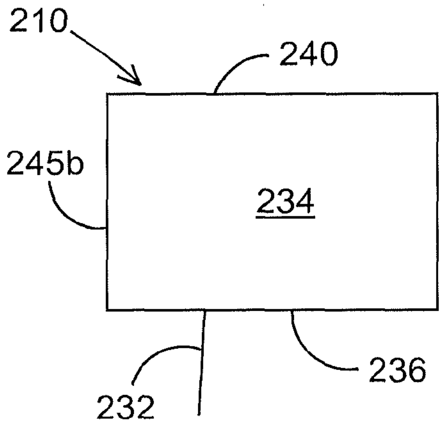

To illustrate a further example, reference is now made to FIGS. 7A and 7C, wherein a pair of cutting elements 1380*a*, 1380*b* are disposed adjacent to and in substantially parallel alignment with, side walls 1318*a*, 1318*b* of the rack 1312. The pair of cutting elements 1380*a*, 1380*b* are optionally affixed to the sides 1318*a*, 1318*b* via a screw fixing 1393 mating in a plug of screw socket 1396. The pair of cutting elements 1380*a*, 1380*b* are substantially planar elements made of plastics material or metal, though preferably a combination of plastic with a metal blade portion 1395. Each cutting element 1380*a*, 1380*b* is hook shaped having a tip 1394. The shape of the tip 1394 permits the narrow tip to be inserted into an aperture 168*a*, 168*b* and allows the blade 1395 (which may be metal and may be sharp) to be shielded from being contacted by a user or customer whilst allowing the blade 1395 to contact and cut along lines of perforation 158*a*, 156*a* as the carton 110 is installed in the rack as shown in FIGS. 7A and 7B. The cutting elements 1380*a*, 1380*b* are preferably formed sufficiently thinly to fit between a side panel 138, 134 of the carton and the articles A contained in the carton. In FIG. 7C, a can is shown as a generally cylindrical article disposed in the carton 110 and the cutting elements fit between the end of the can and the side panel 138, 134.

A third carton embodiment is illustrated in FIG. 8A. The carton blank 230 comprises a severance initiation opening 268 disposed along severance line or perforate line 243. An access panel or trap door 232 is further defined by opposed severance lines 258*a* and a fold line 264. To open the access panel 232, lines 243 and 258*a* are broken, the access panel 232 hinges about fold line 264 as is illustrated in FIGS. 8B and 8C, so that a substantially rectangular opening is created at the rear end of the bottom wall 236 and the trap door hinges about fold line 264 disposed about a one article diameter or more from the end of the carton 210.

Figure 9A:
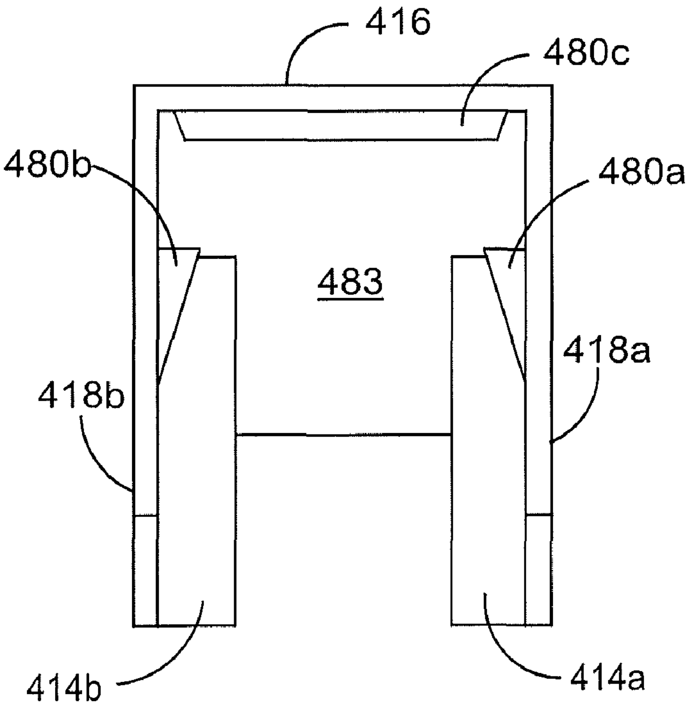
FIGS. 9A and 9B show top and perspective views respectively of a dispensing rack or frame according to a sixth embodiment of the invention having three opening tools.
Figure 9B:
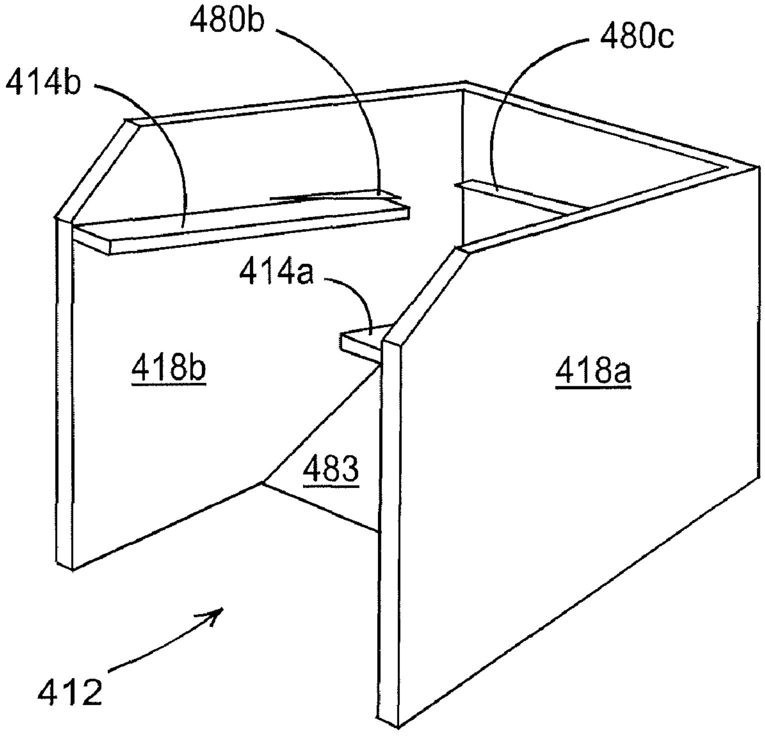

To facilitate the automatic opening of the carton or package 210 as the package is loaded into a dispensing device, a dispensing device according to a sixth embodiment of the invention is provided in FIGS. 9A and 9B. The device 412 does not comprise a stopping mechanism as this can be provided by a store shelf itself, in other embodiments, the device 412 does comprise a stopping mechanism, optionally provided as a front lip. Attached to sides 418*a*, 418*b* is a pair of support elements 414*a*, 414*b* and a pair of cutting elements 480*a*, 480*b*. The cutting elements 480*a*, 480*b* are similar to those described in relation to FIGS. 6A to 6D. However, in order for the carton access means 232 to be accessible, perforate line 243 must be broken. This is optionally achieved by a third or rear cutting tool 480*c* affixed or integrally formed with the back 416 of the device 412. As the carton is fully installed into the device 412, the last push to fit the carton or package 210 into the device causes the rear cutting tool 416 to break the perforate line 243. Thereafter, the access panel 232 is folded about fold line 264 away from the bottom panel 136 to create the opening through which the articles A can be dispensed.

Figure 10A:
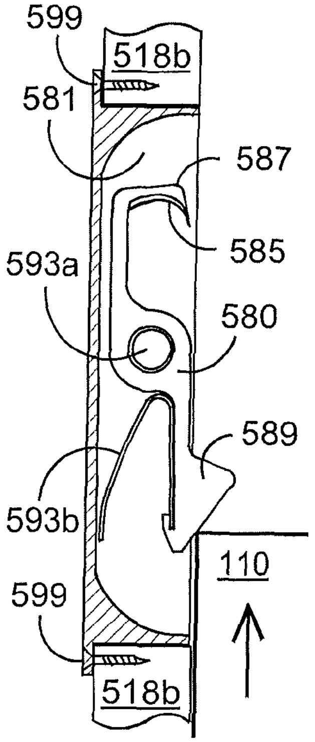
FIG. 10A through 10D are cross-sectional views of a pivotally retractable opening tool and a side view of the retractable opening tool usable for example in the dispensing racks of FIGS. 6A to 6D and FIGS. 9A and 9B.
Figure 10B:
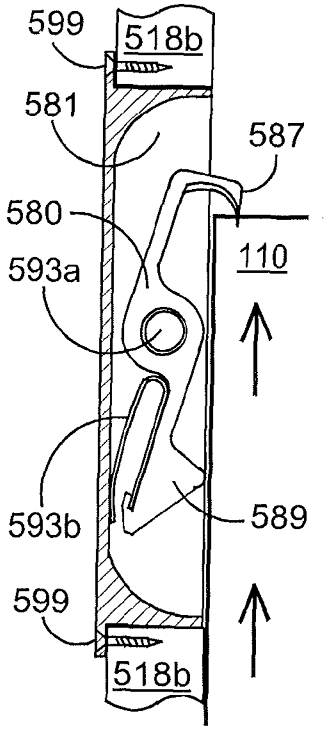

The cutting elements described so far are optionally fixed in the position described and do not move. However, as a further variation, a retractable mechanism can be provided in conjunction with the or each cutting tool to enable the cutting element to be biased into a stowed position within the structural framework of the device, for example, the side, back or supporting element. An exemplary retractable mechanism is illustrated in FIGS. 10A and 10B. It will be understood that the retractable mechanism is exemplary only and other mechanisms for biasing a cutting element into a stowed position and for causing the cutting element to be moved into a use position in response to the initial loading of a carton or package into the device are envisaged.

Figure 10C:
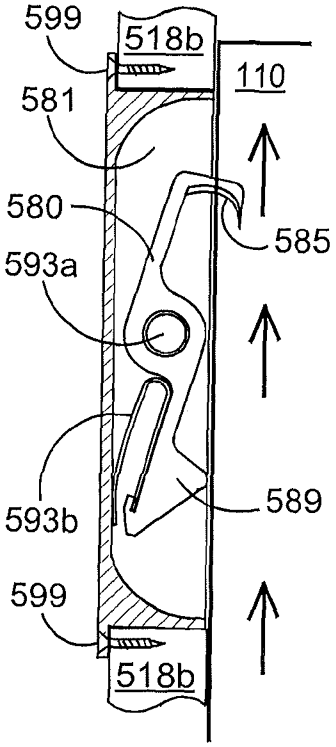
Figure 10D:
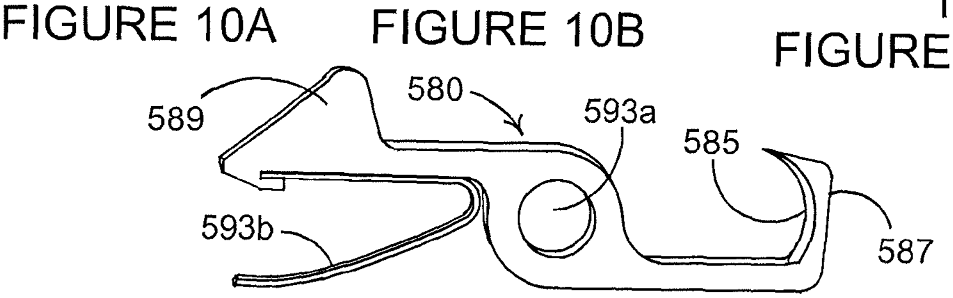

Referring now to FIGS. 10A to 10D, there is shown a package opening arrangement 580 comprising a hooked tip 587, a pivotal element 593*a*, an optional blade 585 (optionally formed of metal) a levering button 589 and a biasing member 593*b*. The package opening arrangement 580 is arranged to fit within a stowing void 581 within a side wall 518*b* of a device (not shown). The tool 580 is pivotally mountable using a pivotal element 593*a* (in this arrangement a round aperture mountable on a pin) so that the tip 587 of the cutting element 280 or the levering button 589 is disposed outside of the stowing void 581 within the side wall 518*b*. The biasing member 593*b*, is oriented and configured to cause the levering button 589 to be projecting out of the stowing void 581 and away from the side wall when the device is in a state of not being used. When a carton is loaded into the device by sliding the carton 110 along supporting elements (not shown), the levering button 589 automatically is depressed and causes the tool 280 to pivot about pivotal fixing 593*a* and the cutting tip 587 and optional blade 585 to be moved out of the stowing void and into the path of the carton 110. The weight of the carton 110 maintains the cutting element 580 in the use position. As the carton 110 is further installed (as is illustrated in FIGS. 10B and 10C), the cutting element 110 engages the weakened area of the carton access means 132 and causes the package to be opened for dispensing of articles. Once the carton 110 is removed from the device, the biasing member encourages the bladed tip 587/585 to retract into the stowed position and projects the levering button ready for further activation of the cutting tool when required. A benefit of this arrangement is that in the embodiments where it is required to provide a sharpened bladed element that could cause possible injury, the sharpened bladed element is stowed out of harms way when the device is empty and is only allowed to project from that position when the levering button is deliberately pressed, say by a carton 110 and thus the risk of injury is mitigated.

Figure 11:
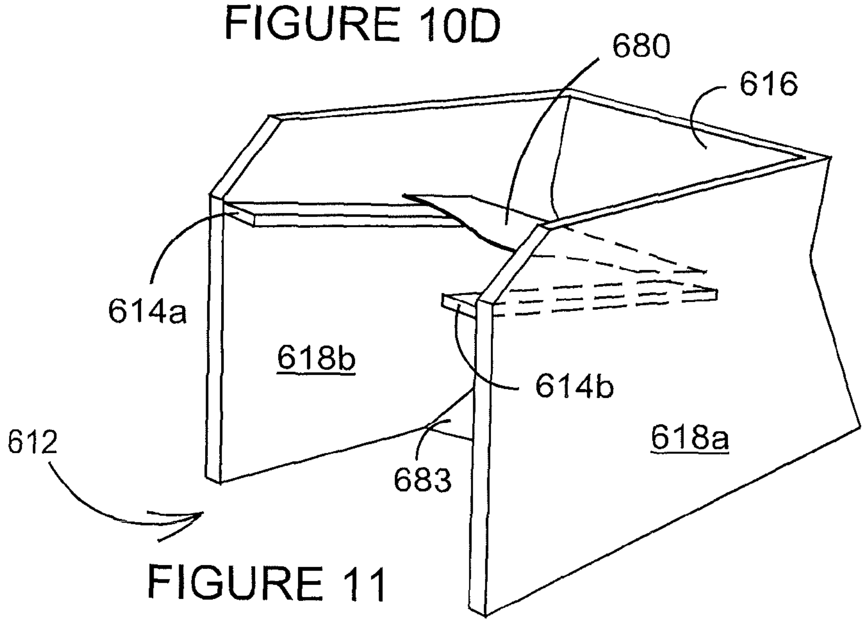
FIG. 11 shows a perspective view of a dispensing system, including a rack and an opening tool, according to a seventh embodiment of the invention having a single opening tool disposed transversely across and toward the middle of the dispensing rack.

A further display and dispensing device 612 suitable for receiving and automatically opening a carton 210 is illustrated in FIG. 11 wherein a transverse cutting element 680 extends between side walls 618*a*, 618*b*. The cutting element 680 is shaped such that a leading edge of the cutting element 680 is disposed substantially centrally and is operable to engage a severance initiation point such as aperture 268 for causing further breaking of weakened lines 243, 258*a*, and 258*b* for releasing access flap 232. The cutting element 680 is disposed in vertical and substantially parallel alignment with each of two opposing deck elements or supporting ledges 614*a*, 614*b*.

Optionally the device 612 is a unitary formation formed as a one piece moulded plastic. Though the device 612 does not comprise a stopping mechanism, in other embodiments a stopping mechanism is incorporated. In those embodiments where no stopping mechanism is incorporated a front lip of an in-store shelf may be used to stop articles A from rolling straight out of the device. Likewise, the device 612 does not comprise a base portion and the store shelf provides a surface onto which articles A dispensed into the lower track are held.

Figure 12A:
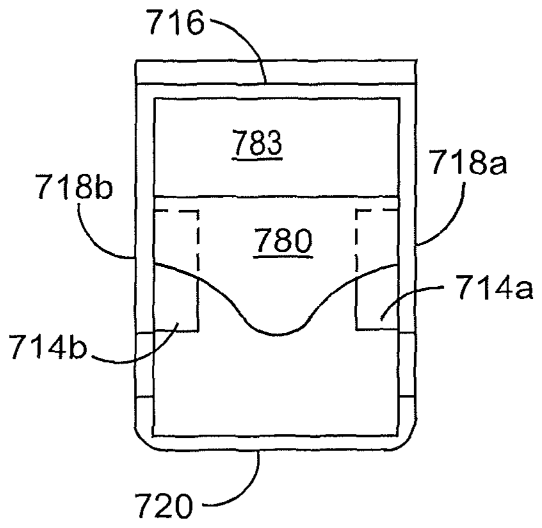
FIGS. 12A to 12C show top, perspective and side views of a rack or frame according to an eighth embodiment of the present invention having a single opening tool disposed transversely across and toward the front of the dispensing rack.
Figure 12B:
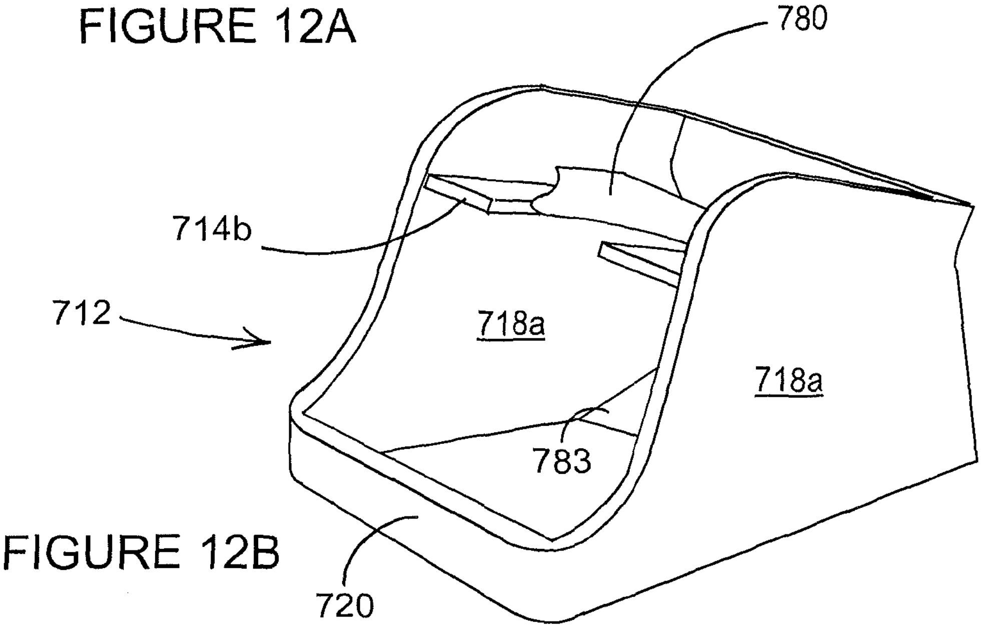
Figure 12C:
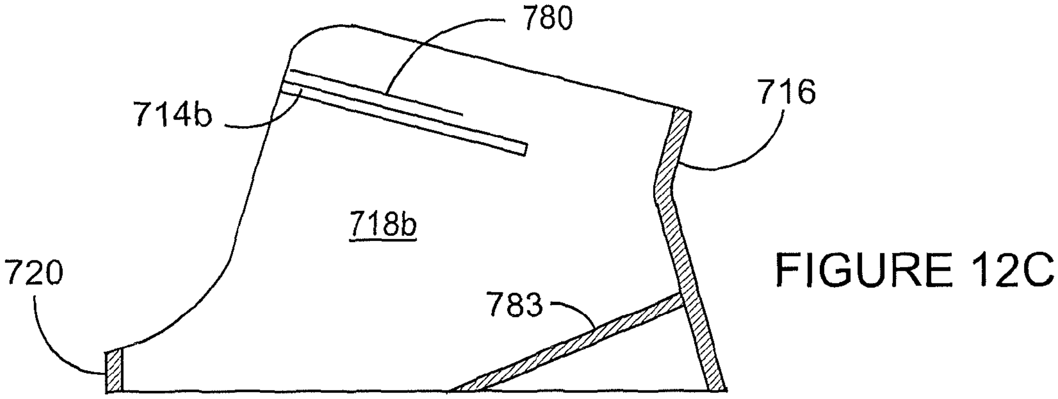

A variation of the device 612 is shown in FIGS. 12A-12C, the difference being that the cutting tool 780 is disposed more toward the front of the device 712 rather than in the case of device 612 where the cutting tool 680 is disposed toward the middle of the device. The directional references "toward the middle" and "toward the front" are used relative to the positions of the front and back of the devices 612, 712. The precise position of the cutting element 680, 780 is determined by the size of device, size of packages used, size of articles (and hence size of access opening) and type of access opening used. A stopping mechanism 720 is integrally provided as part of device 712, as described, this feature is optional.

Yet a further embodiment of a display and dispensing device is shown in FIGS. 13A to 13G. The package opening tool comprises an angled plate 880 disposed, in this illustrated arrangement in close proximity to the front of the device 812. A carton is opened by leveraging the weakened part of the access means of the carton about the opening device 880 as is shown in the accompanying illustrations. The carton 210 is first angled so that the severance initiation opening 268 of carton 210 is impaled onto the front tip 887 of the opening device 880; the carton 210 is held at an angle similar to that of the opening device 880 in order to achieve this.

Figure 13A:
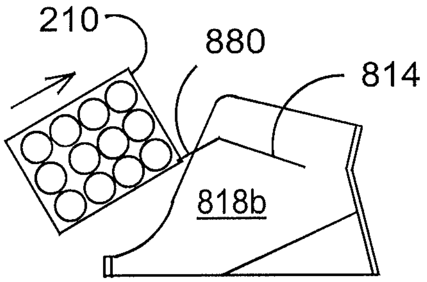
FIGS. 13A to 13G show side and perspective views of a dispensing system according to a ninth embodiment of the present invention, wherein the system includes a front positioned lever opening tool.
Figure 13B:
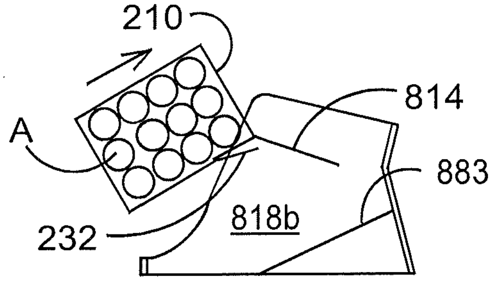
Figure 13C:
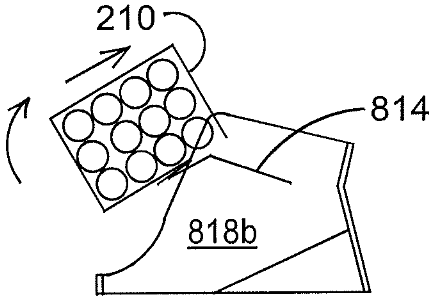
Figure 13D:
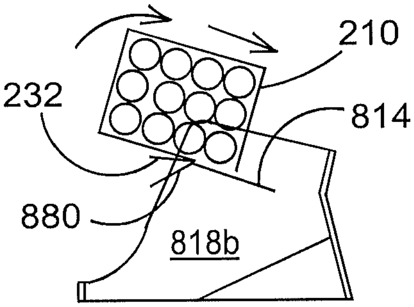
Figure 13E:
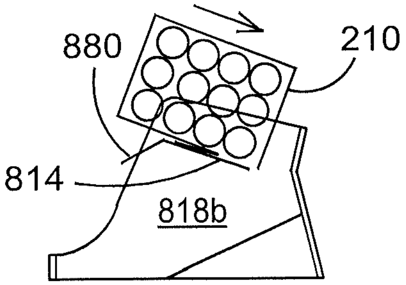
Figure 13F:
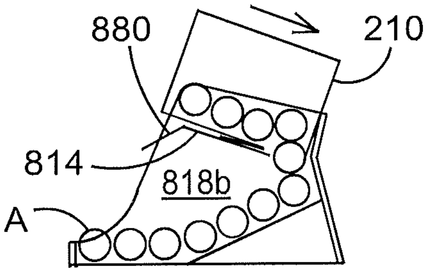
Figure 13G:
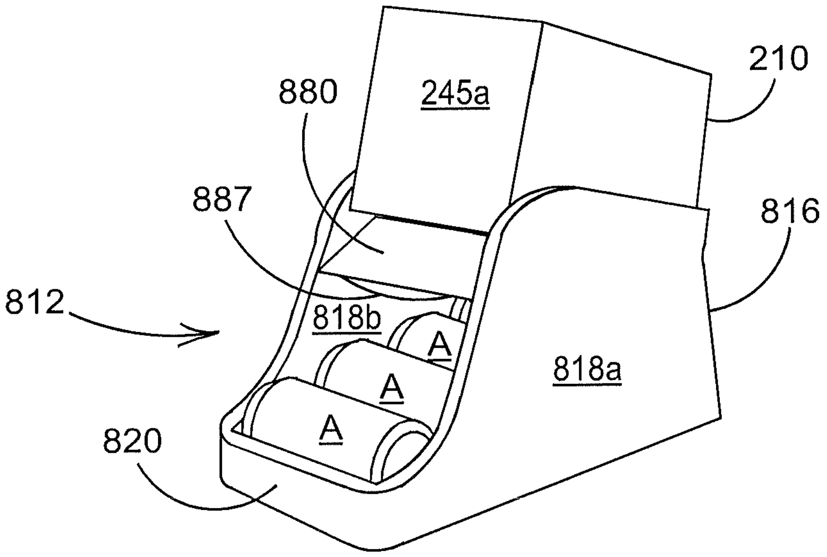

The carton 210 is fed further onto the opening device 880 during which operation, perforate lines 243, 258*a* and 258*b* are broken to release access flap 232 (see FIG. 13B). The opening tool 880 thereafter provides a barrier to prevent early release of articles. Likewise, the deck elements or supporting ledges are disposed across the front and middle parts of the device 812 so that as the carton 210 is moved further into the device 812, the opposed supporting ledges 814 provide a barrier to close the opening and prevent premature release of articles A. As the carton 210 is further installed, the access flap 232 is folded between the supporting ledges 14 and the bottom of the carton 236 (see FIGS. 13C to E). Once the carton is fully installed, the opening is aligned with a notional vertical shaft and articles are free to roll out of the carton 210 and into the lower track (see FIG. 13F). The supporting ledges 814 in some embodiments are not inclined. The opening causes sufficient dislodgement of the articles that nearly all if not all of the articles nevertheless roll out of the carton and the alight incline offered by the folded access flap 232 may provide a sufficient forward feeding mechanism to cause the last article to roll out.

Though in the aforedescribed embodiments of dispensing device, many of the devices have had a unitary structure or moulded form, it is also envisaged that such dispensing devices can be assembled from a kit of modular parts. An example of how a display and dispensing device can be assembled from a kit of modular parts is illustrated in FIGS. 14A to 14E.

Figure 14A:
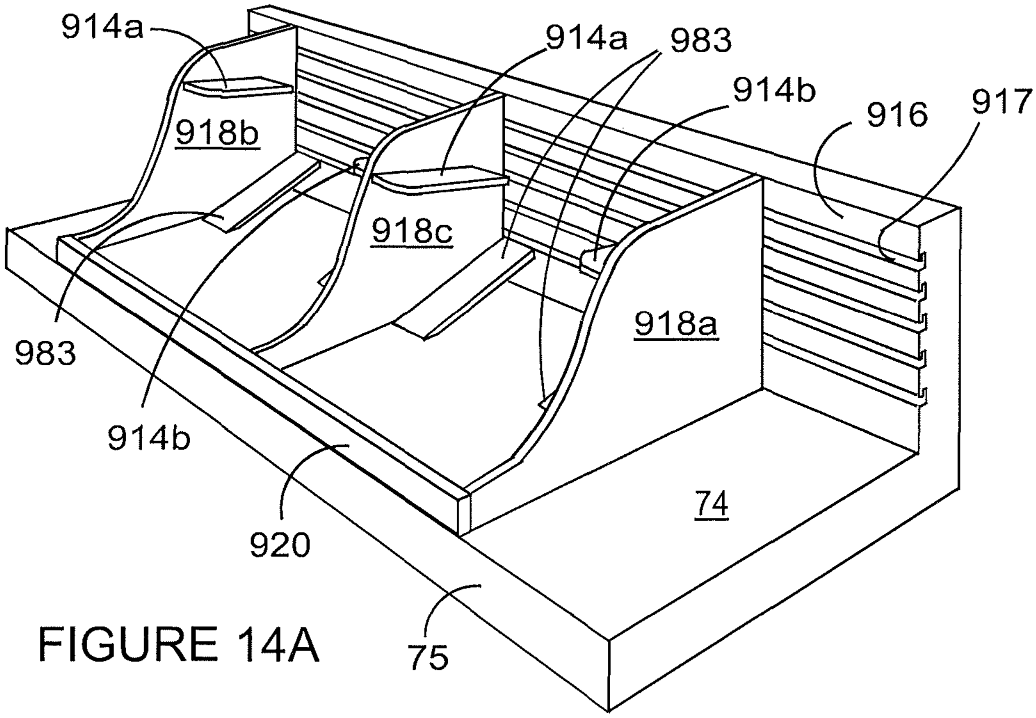
FIGS. 14A to 14E illustrate perspective, front and side views respectively of an exemplary modular system for forming dispensing racks, such as those shown in dispensing system embodiments 1 to 9.
Figure 14B:
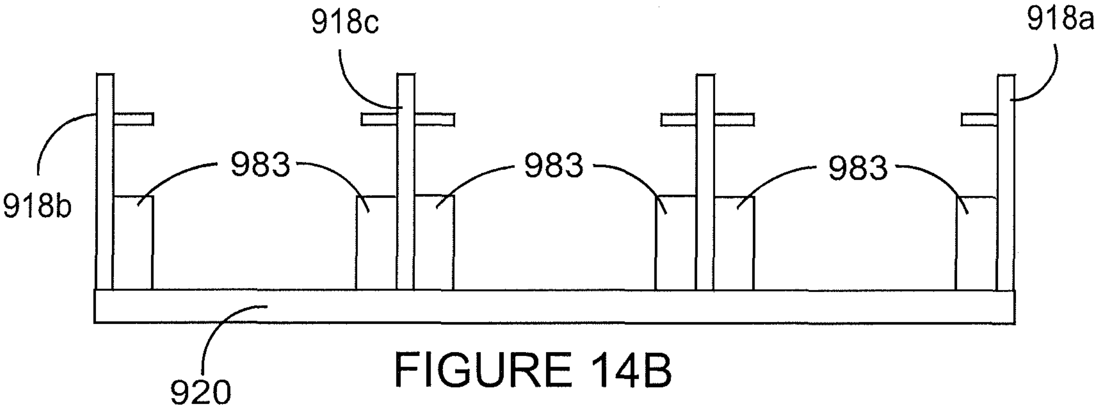
Figure 14C:
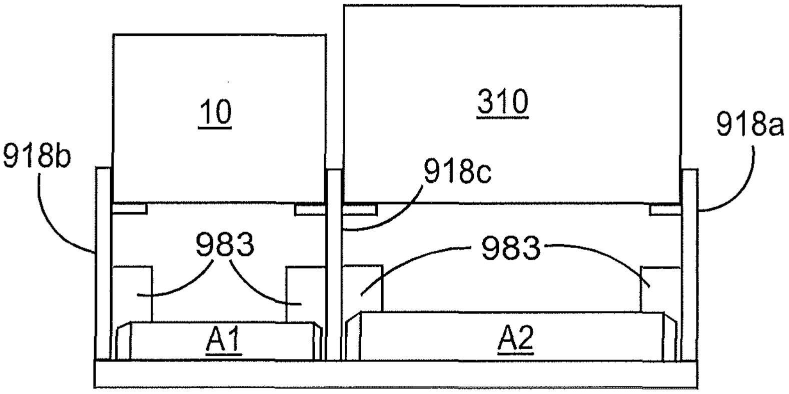
Figure 14D:
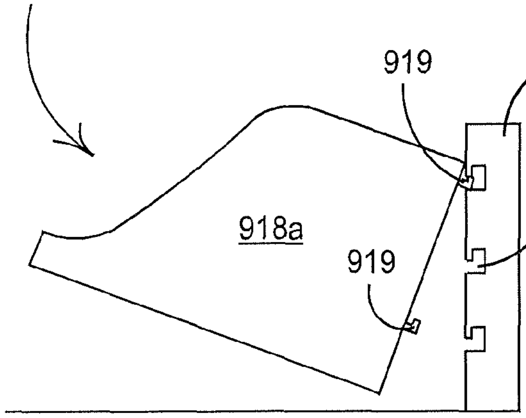
Figure 14E:
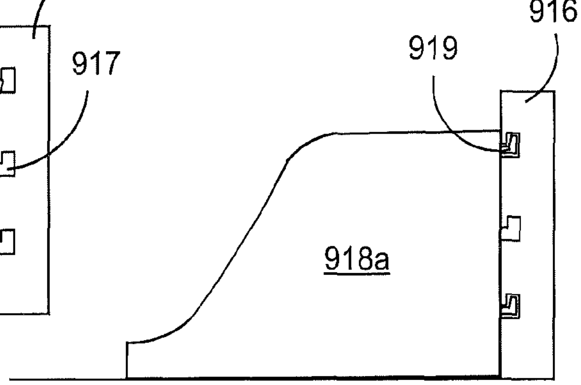

In FIG. 14A a series of side panels having at least one, optionally inclined, supporting ledge 914*a*, 914, secured thereto and having at least one forward feeding mechanism (optionally a ramp) 983 secured thereto are shown. Middle side panels 918*c* comprise two supporting ledges 914*a*, 914*b* and two ramp elements 983. Right and Left-hand end panels 918*a*, 918*b* comprise only one supporting ledge 914*b*, 914*a* and only one ramp element 983. A stopping mechanism 920 is provided as a separate piece. The side panels are attachable by fixing elements 919 to a back panel 916 (see FIGS. 14D and 14E). The back panel 916 comprises a series of grooves, apertures or the like for receiving the peg or hook style fixing elements 919 of the side panels so that the side panels can be removably affixed to the back 916. By providing a series of grooves or apertures along the back 916, a variety of locations are available for attaching side panels 918*a*, 918*b*, 918*c* and in this way display and dispensing devices 912 of different widths can be created (see FIG. 14C). This may be beneficial where it is required to stock and display articles A1 of a first size alongside articles A2 of a second size and where the display and dispensing device accommodates cartons 10, 310 of different sizes due to the different articles types A1, A2.

A further feature of a modular system is that the cutting tools can be removable affixed to the side panels so that, if a carton having a different access mechanism is to be stored in the display and dispensing device, a more appropriate cutting tool 980 can be mounted on the dispensing device. In FIGS. 15-19B five examples of the module 984, 1184, 1484, 1584 onto which the cutting tool 980, 1080, 1180, 1480, 1580 is mounted are shown.

Figure 15:
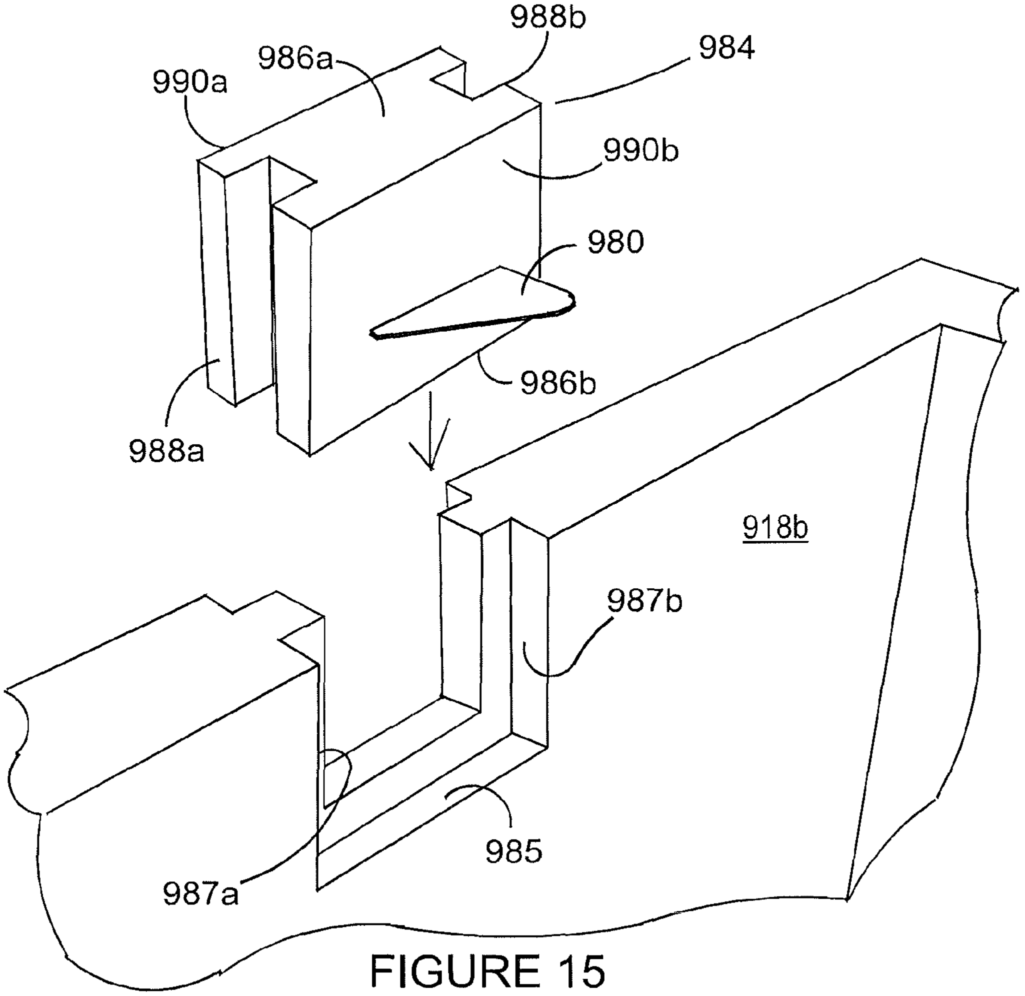
FIG. 15 shows a first exemplary modular fixing for a side positioned cutting tool.

In FIG. 15, the module is 'H'-shaped in cross-section and is received in an 'H'-shaped socket of the side 918*b*. Side edges 988*a*, 988*b* of the tool module 984 are mated using a frictional fit against inner side walls 987*a*, 987*b* of the socket 985. The tool module 984 has front and rear faces 990*b*, 990*a* that are designed to fit physically and aesthetically within the side wall 918*b*. Though the bottom face 986*b* of the tool module 984 cannot be seen once the tool module is installed, the outer top face 986*a* may be formed to match the side panel 918*b* or formed to contrast therewith as required by design considerations. The plug and socket type fit of the tool module with the side wall 918*b* enables a modular formation of the display and dispensing devices and/or a retro-fitting of cutting tools and/or swapping of tools for more suitable tools or replacement tools in case of breakage.

Figure 16:
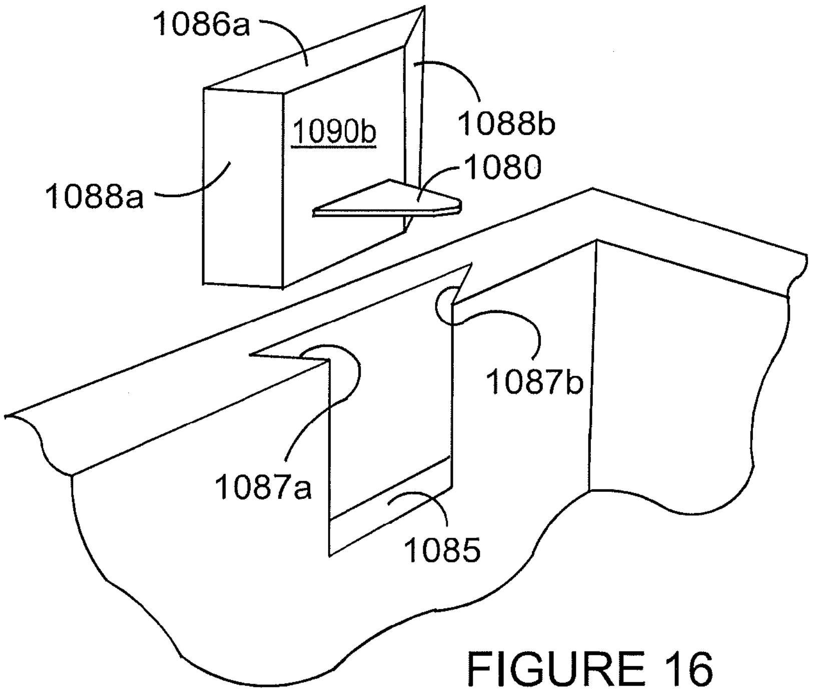
FIG. 16 shows a second exemplary modular fixing for a side positioned cutting tool.

The tool mounting of FIG. 16 is dovetail shaped and slots into a similarly shaped dovetail socket having tapered sides 1087*a*, 1087*b* that match the oblique sides 1088*a*, 1088*b* of the tool module. Again, the front, rear and top faces 1090*b*, 1086*a* of the tool module may be formed to match the colour and texture of the side panel.

Figure 17:
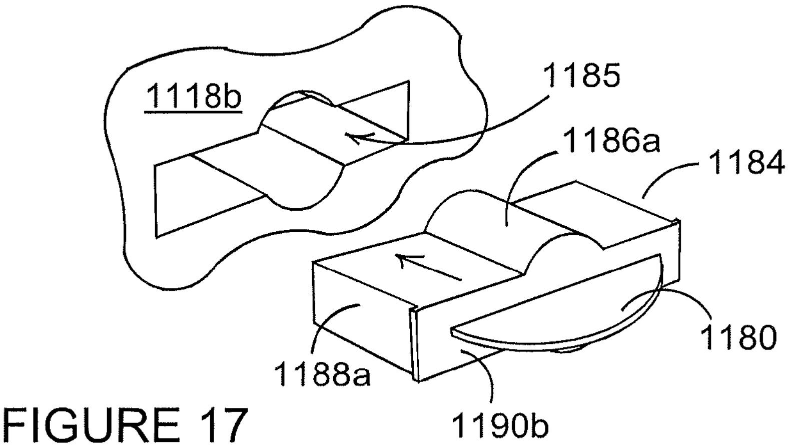
FIG. 17 shows a third exemplary modular fixing for a side positioned cutting tool.
Figure 18:
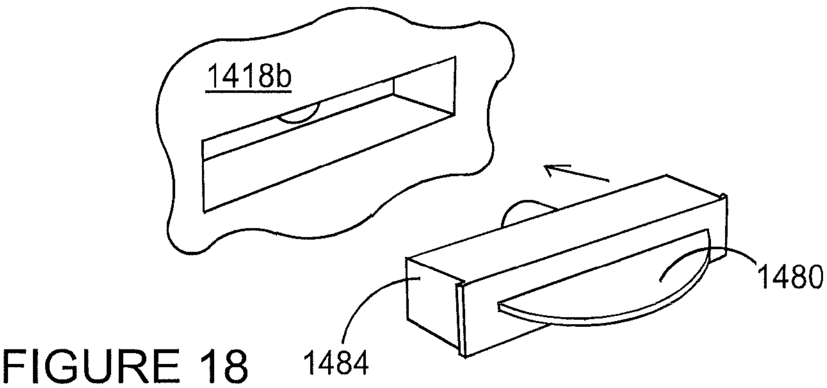
FIG. 18 shows a fourth exemplary modular fixing for a side positioned cutting tool.
Figure 19A:
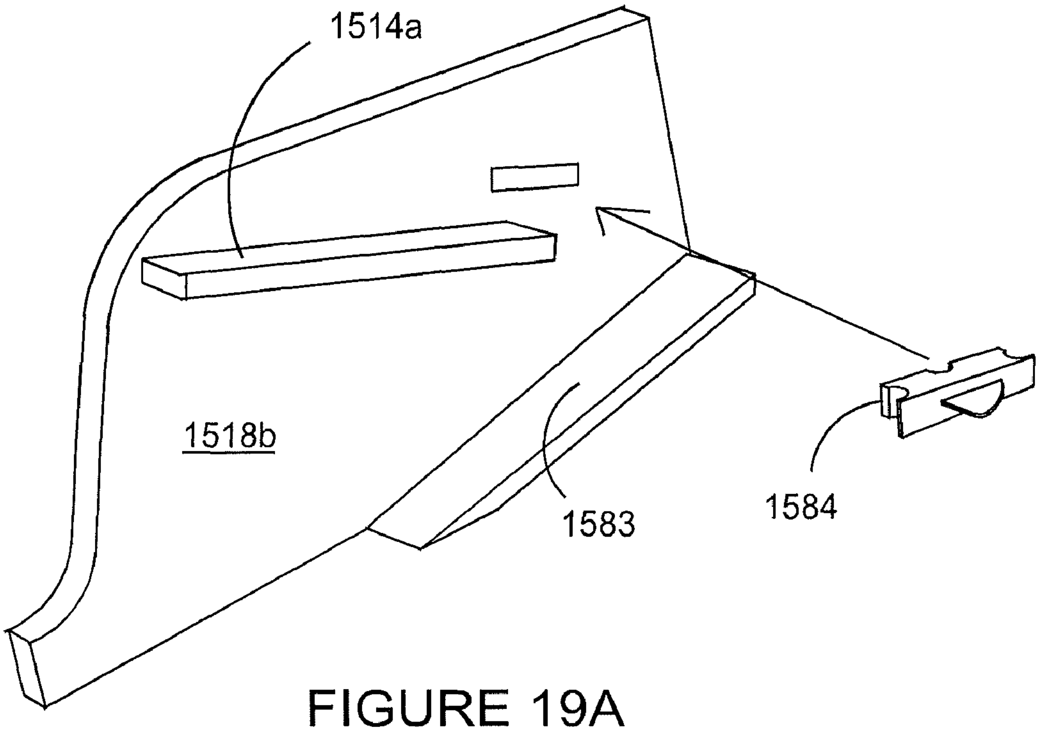
FIGS. 19A and 19B show perspective and cross-section views of a fifth exemplary modular fixing for a side positioned cutting tool.
Figure 19B:
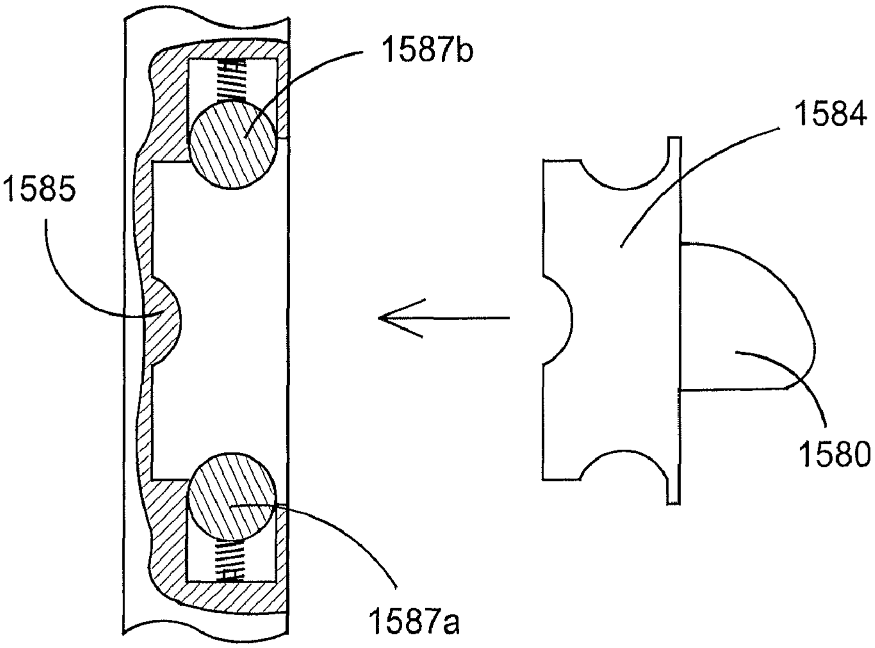
Figure 20:
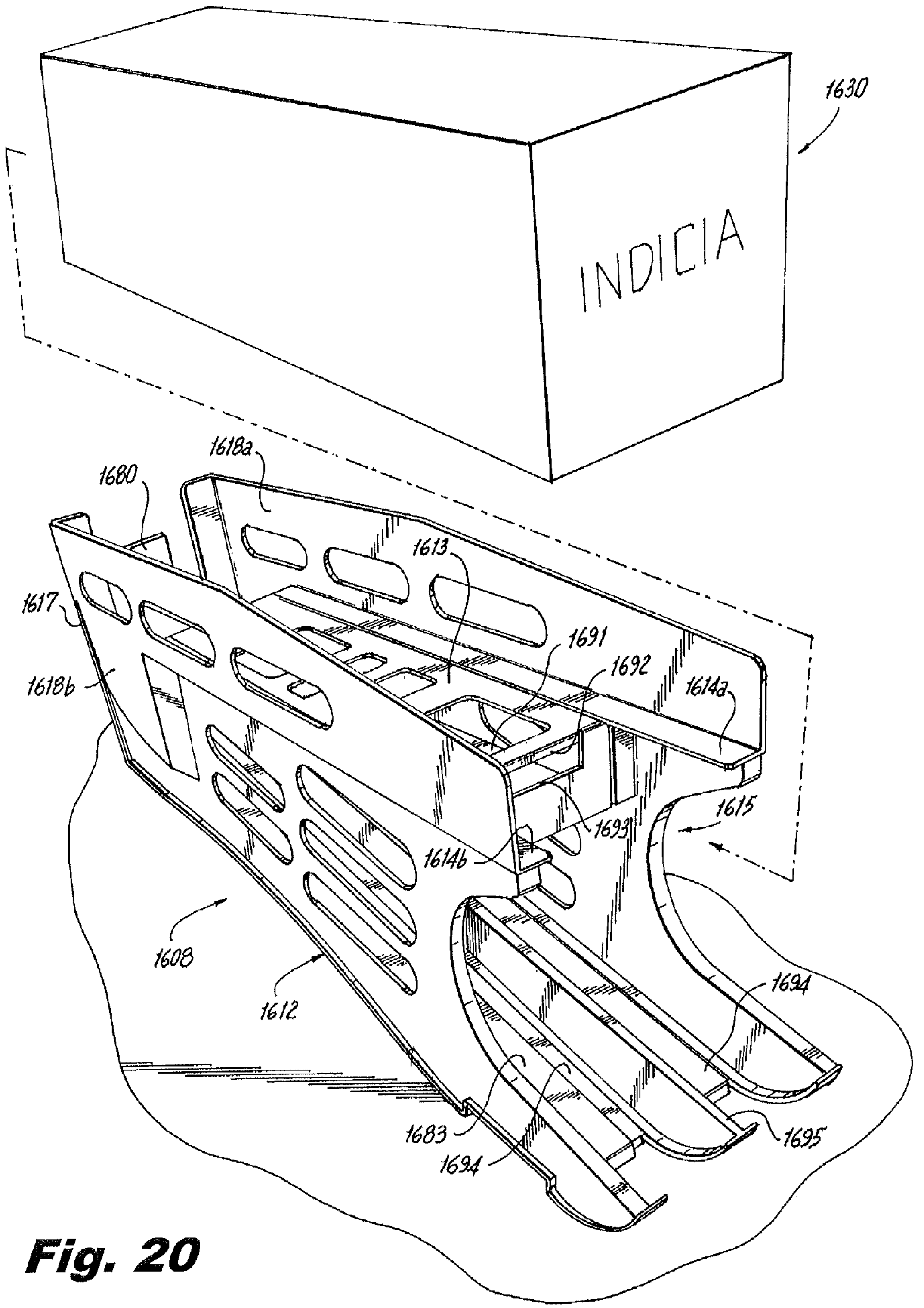
FIGS. 20 and 21 are front and rear perspective views of a dispensing rack or frame which has been constructed in accordance with a tenth exemplary embodiment of the present invention.
Figure 21:
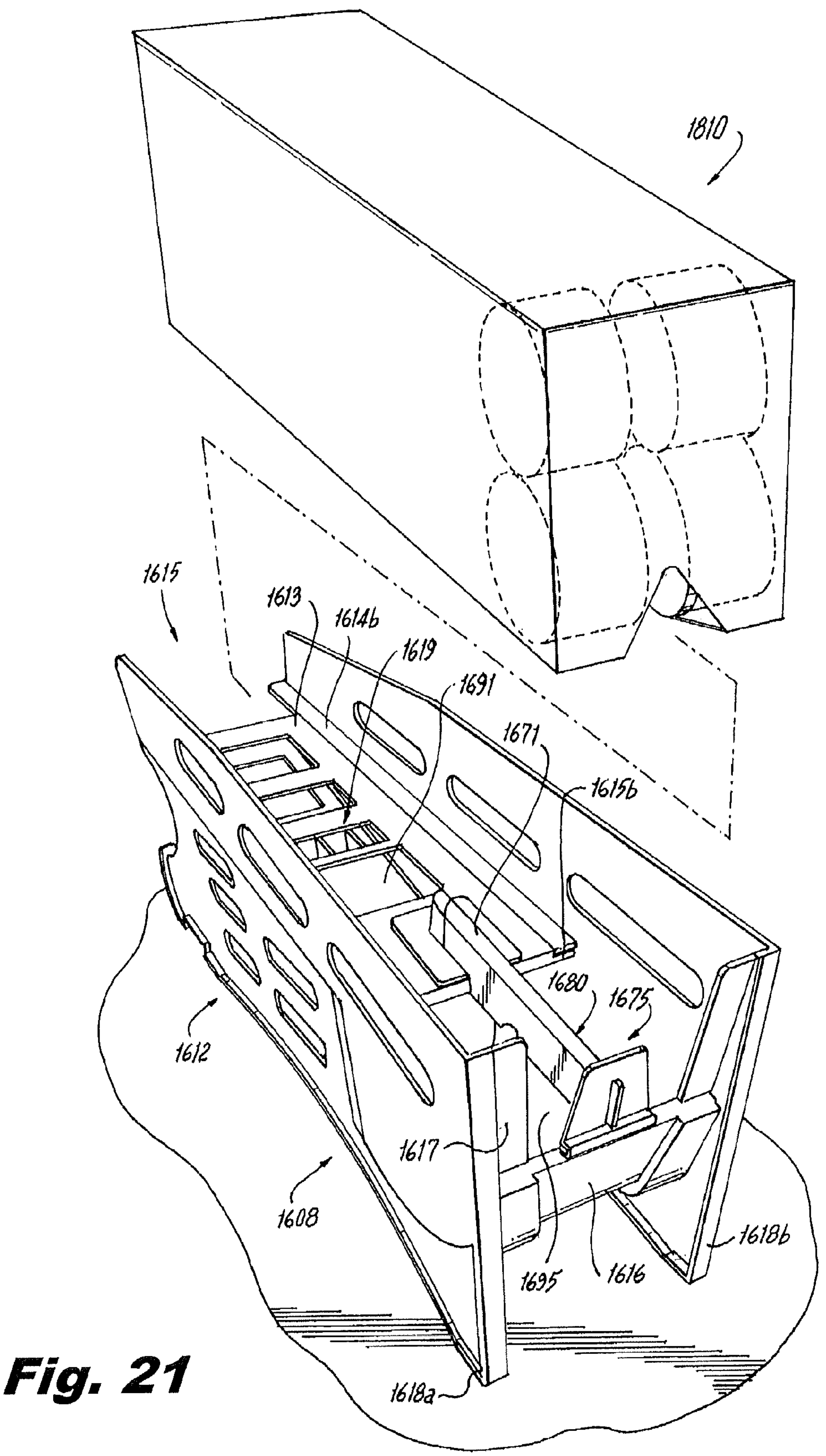

In FIG. 17 onwards, the tool modules fits transversely into the body of the side wall rather than slotting downwardly into the sides. The plug and socket mechanisms discussed can have many and various complimentary formed fittings compared to that shown. In FIG. 19B a socket mechanism has sprung biased balls and a tool module having arcuate mating portions is realisably held within the socket.

Referring now to FIGS. 20 through 31, which illustrate a dispensing and display system that has been constructed in accordance with a further preferred embodiment of the present invention. Like the previously described systems, the dispensing and display system disclosed in these figures includes a display device 1608 and a package 1810.

Figure 26:
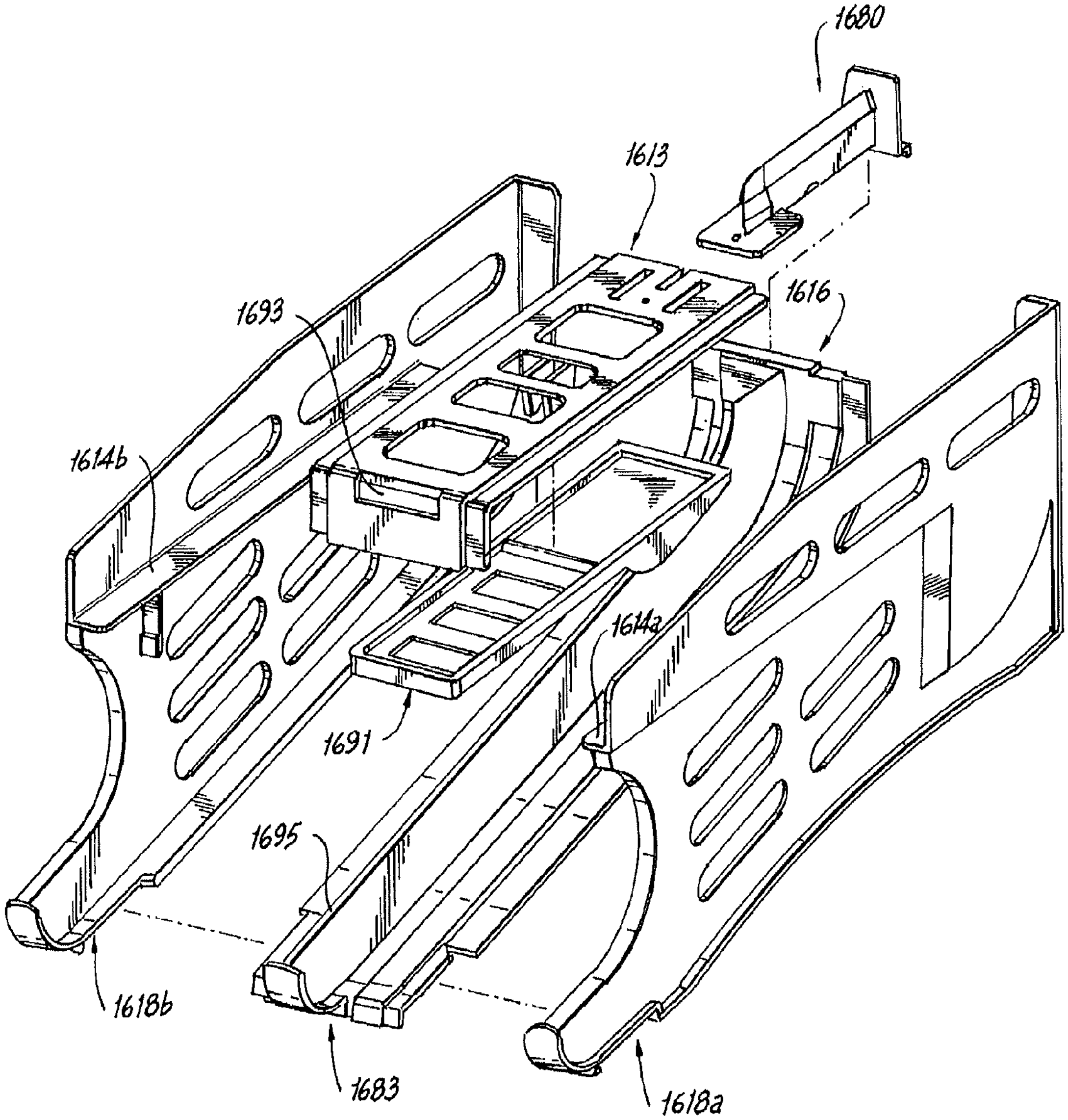
FIG. 26 is an exploded perspective view of the dispensing rack or frame used in the dispensing system of FIGS. 20 and 21.
Figure 27:
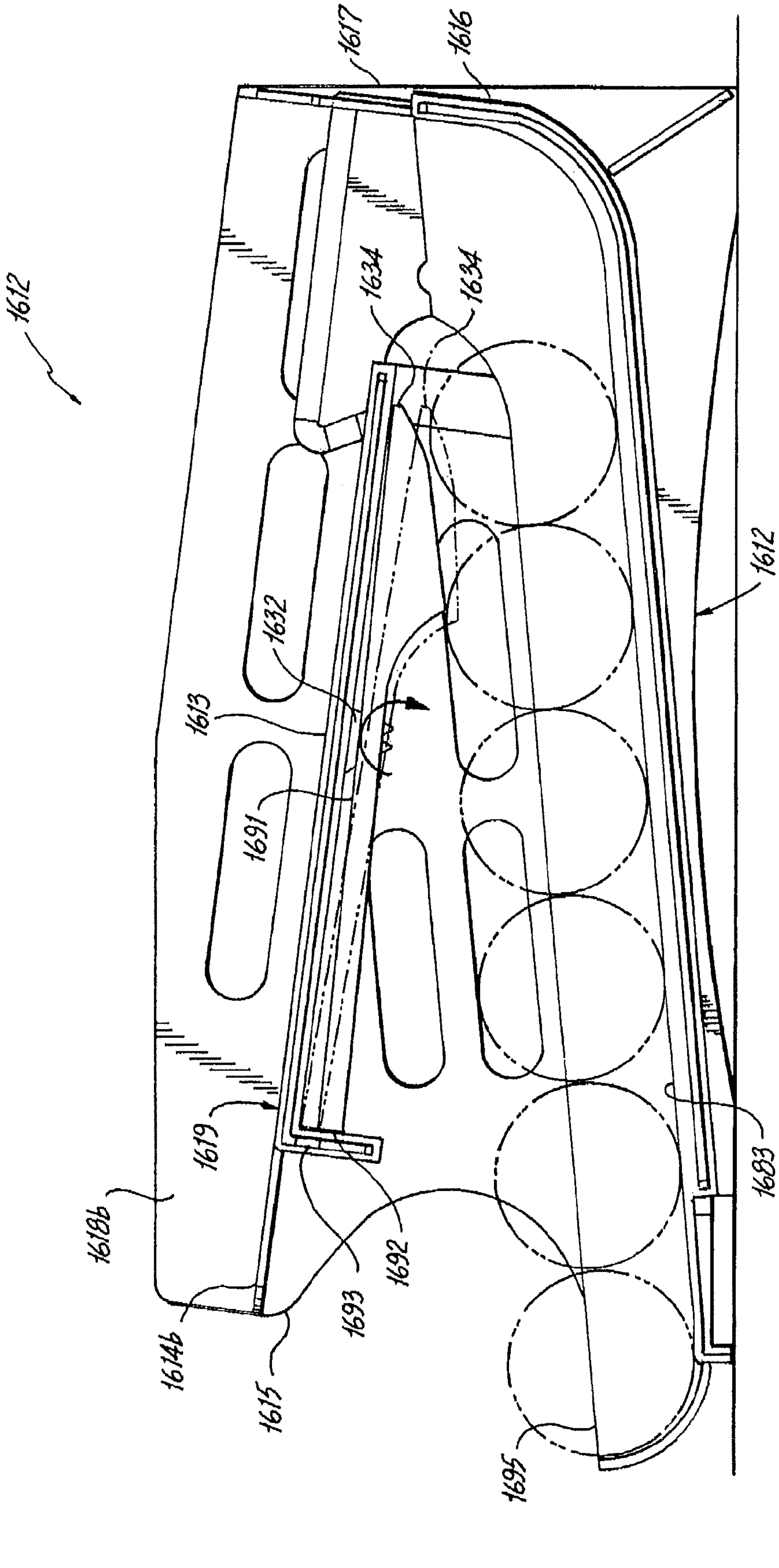
FIG. 27 provides a cross-sectional view of the dispensing system of FIGS. 20 and 21 which illustrates the pivoting movement of the flag element.

FIGS. 20-27 provide various views of dispensing device 1608, including front and rear perspective views of the device (FIGS. 20 and 21, respectively), perspective views of various component parts which make up the dispensing device (FIGS. 22-25), an exploded perspective view of the dispensing device (FIG. 26), and a cross-sectional view of the dispensing device (FIG. 27).

Similar to the previously described embodiments, display device 1608 includes, among other elements, a frame 1612 and an opening tool 1680. The frame 1612 has laterally opposed side walls 1618*a*/1618*b* which extend between the front end 1615 of the frame and the rear end 1617 of the frame. The frame 1612 also includes an upper support deck 1619 extending at least partially between the front and rear ends 1615/1617 and below which a product display area is provided.

The upper support deck 1619 is formed in part by laterally opposed rails 1614*a* and 1614*b* of side walls 1618*a*/1618*b*. The laterally opposed side walls 1618*a*/1618*b* are adapted and configured for guiding a package as it is moved longitudinally along the upper support deck 1619.

A floor member 1613 extends between the rails 1614*a*/1614*b* and forms the remainder of the upper support deck 1619. As shown in FIG. 25, floor member 1613 includes a front panel 1620 that can have product related indicia printed, etched or formed thereon or can include structure for holding product related indicia or material, including but not limited to, coupons. Front panel 1620 of floor member 1613 has a viewing window 1693 formed therein, the purpose of which will be described herein below.

The underside of floor member 1613 also includes fulcrum member 1632 which includes a female engaging member into which a corresponding male feature 1676 formed on the topside of the flag element 1691 is inserted. As a result, the flag element 1691 is capable of pivoting about the fulcrum member 1632, the purpose of which will be described herein below.

Frame 1612 also includes a base panel or lower display deck 1683 and a rear wall 1616 which is configured to guide products to the product display area. As best shown in FIGS. 26 and 27, the interior surface of rear wall 1616 defines a ramp or curved surface which assists the transition of the dispensed articles to the product display area. Moreover, lower display deck 1683 includes a lane divider 1695 which establishes two product distribution channels within the lower display area of the frame 1612.

Referring now to FIG. 22 which provides a perspective view of opening tool 1680. Opening tool 1680 has an upwardly projecting cutting or severing panel 1671 which extends between a mounting tab 1672 and a tongue member 1674. The cutting panel 1671 is provided with a forward edge 1673, which, as will be discussed in detail below, is adapted for cutting or severing a package or carton as it is slid along the upper support deck 1619.

Mounting tab 1672 is adapted and configured to snap into a corresponding socket formed in the rear wall 1616 of frame 1612. As shown in FIG. 26, tongue member 1674 is inserted into a channel 1630 formed on the underside of the floor member 1613. The channel 1630 is best viewed in FIG. 25. A protuberance 1632 is provided on an upper surface of tongue member 1674, which engages within a recess 1634 formed on the underside of the floor member 1613 and thereby secures the tongue member 1674 with channel 1630. The floor member 1613 is also provided with a slot 1636 into which the forward end or edge 1673 of cutting panel 1671 is inserted.

FIG. 24 illustrates a further embodiment of an opening tool that can be used in display device 1608 and has been designated as reference numeral 1780. Like opening tool 1680, opening tool 1780 includes an upwardly projecting cutting or severing panel 1771 which extends between a mounting tab 1772 and a tongue member 1774. The cutting panel 1771 is provided with a forward edge 1773 which, as will be discussed in detail below, is adapted for cutting or severing a package or carton as it is slid along the upper support deck 1619.

Opening tool 1780 is secured in a similar fashion as opening tool 1680 to frame 1612 using mounting tab 1772 and tongue member 1774. However, unlike opening tool 1680, the severing panel 1771 of opening tool 1780 includes laterally opposed guide ribs 1777 (near side shown) formed on each side of the panel. The guide ribs 1777 are adapted and configured to guide or urge the access panels 1878/1879 associated with package 1810 to open outwardly and not inwardly.

Referring now to FIG. 27 which provides a cross-sectional view of frame 1612. In this figure it is readily apparent that the upper support deck 1619 and the lower deck 1683 of the frame 1612 are arranged at an angle with respect to horizontal. More specifically, the upper support deck 1619 slopes in a downward direction from the front end 1615 to the rear end 1617 of the frame and the lower deck 1683 slopes downward in the opposite direction. As discussed previously, this arrangement allows gravity to be used to move the articles or products from within the carton or package down into the lower display area and towards the front end 1615 of the frame 1612 where they can be accessed by consumers.

Figure 28:
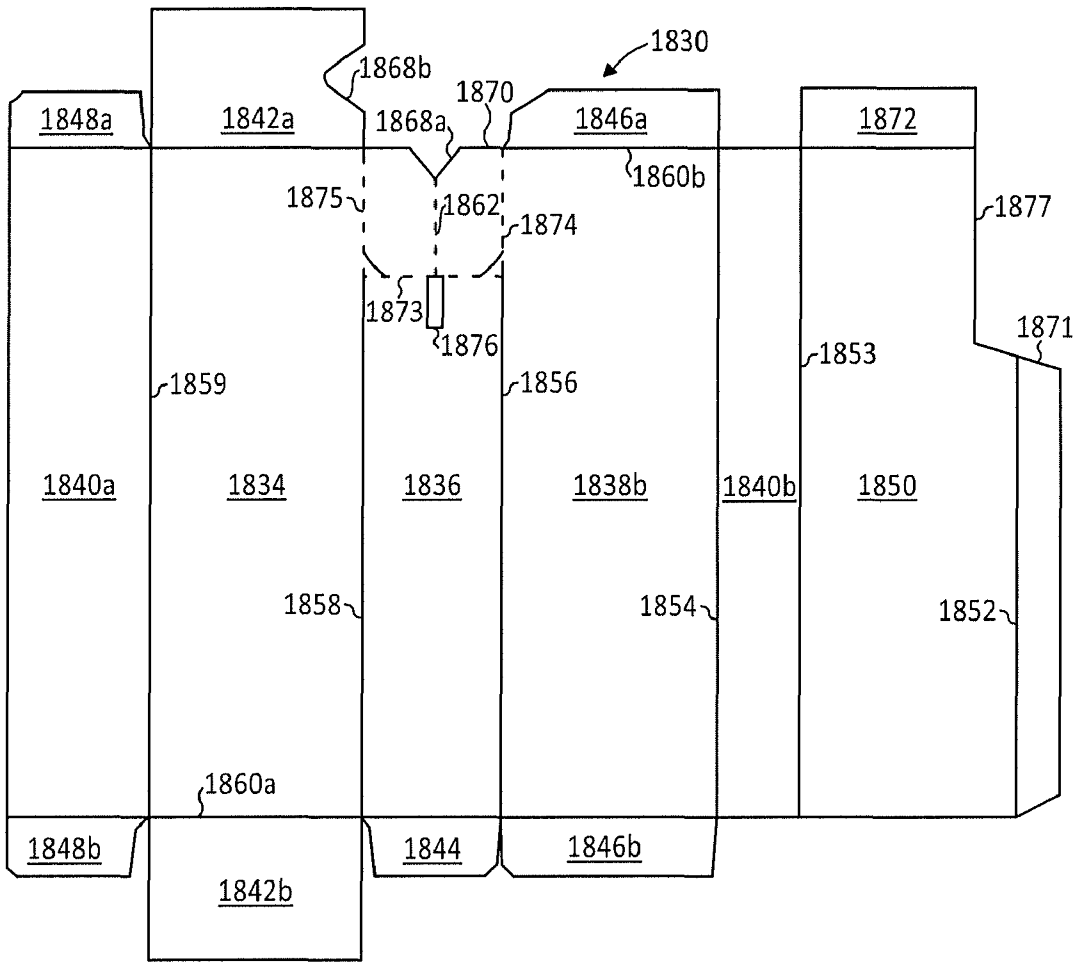
FIG. 28 is a blank for forming a carton or package according to yet a fourth carton embodiment of the invention, which carton is suitable for use with dispensing systems shown in FIGS. 20 and 21.

Referring now to FIG. 28 which provides an illustration of carton blank 1830 used to construct package 1810. Carton blank 1830 includes a bottom panel 1836, a first side panel 1834, a second side panel 1838, a outer top panel 1840*a*, an inner top panel 1840*b*, center panel 1850 and a glue flap 1871. These panels hinged together in series along fold lines 1852, 1853, 1854, 1856, 1858, and 1859. The carton blank also includes end flaps 1848*a*-*b*, 1842*a*-*b*, 1844, 1846*a*-*b* and 1872.

Bottom panel 1836 of the carton blank 1830 has a first longitudinally extending severance line 1862 positioned about its centerline which extends from a severance initiation notch 1868*a* to a second laterally extending severance line 1873. Moreover, fold lines 1874 and 1875 are provided on the lateral edges of the bottom panel 1836. Still further, two triangular cutouts and a rectangular cutout 1876 have been provided in bottom panel 1836. Lastly, end closure flap 1842*a* includes a severance notch 1868*b* and center panel 1850 includes a notch 1877, the purpose of these features will be discussed herein below.

Figure 29:
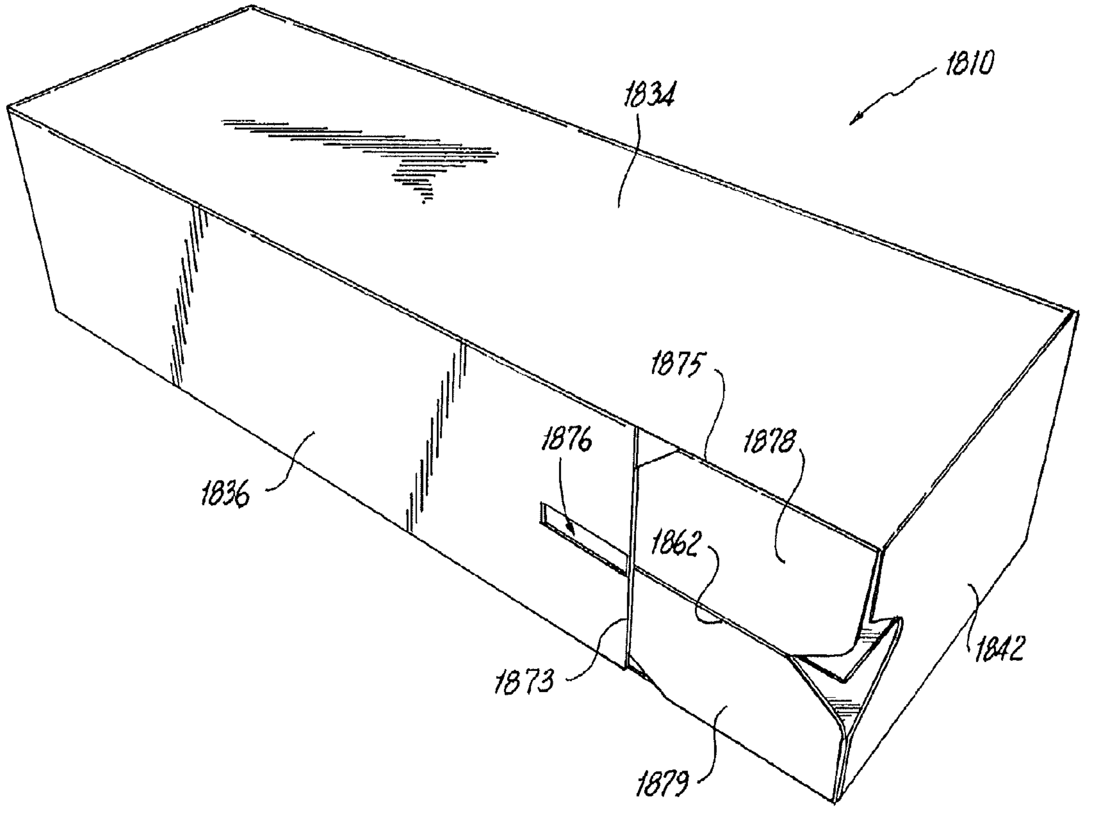
FIG. 29 is a perspective view showing the bottom of the product package which has been constructed using the carton of FIG. 28.
Figure 30:
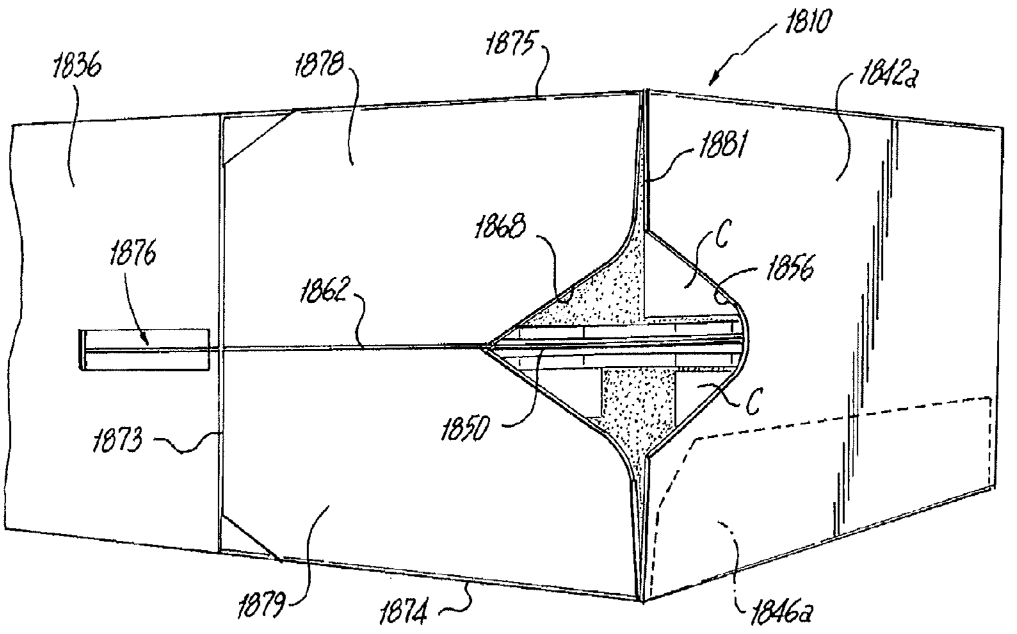
FIG. 30 is a close-up perspective view of the hinged doors formed in the bottom of the product package of FIG. 29.
Figure 31:
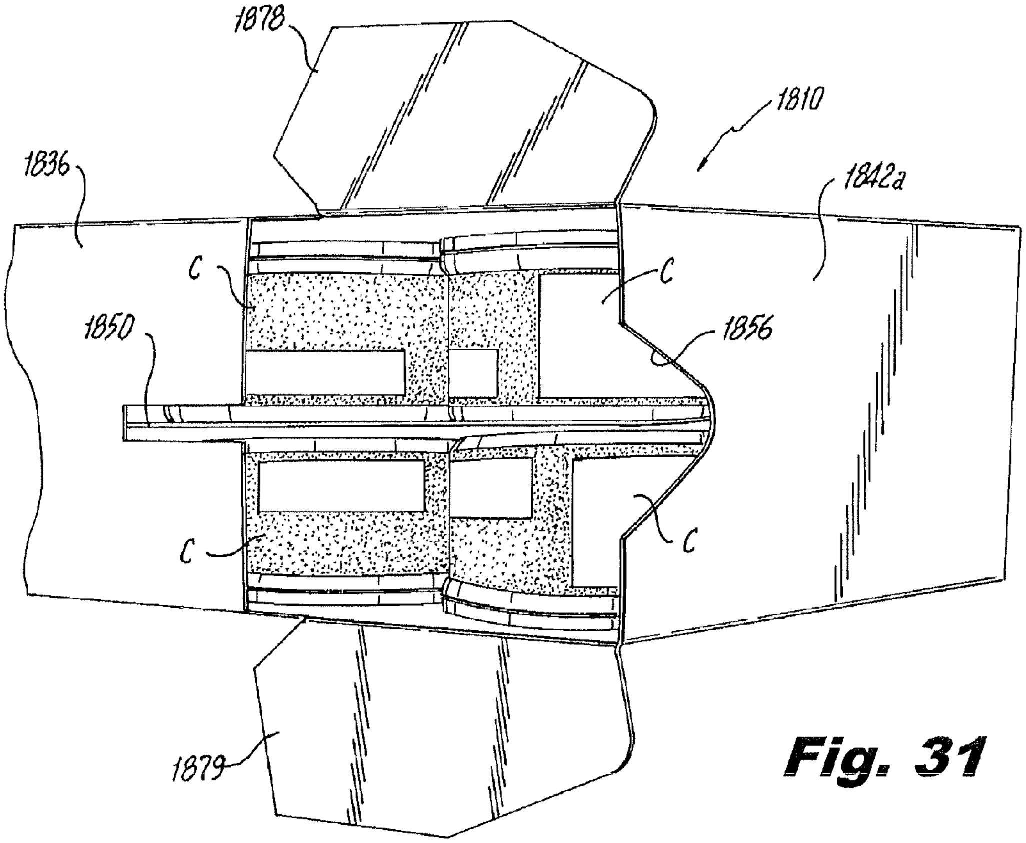
FIG. 31 is a close-up perspective view of the hinged doors formed in the bottom of the product package of FIG. 29 shown in the open position.

Blank 1830 is foldable along lateral fold lines 1860*a*-*b* and longitudinal fold lines 1852, 1853, 1854, 1856, 1858, and 1859 into a product retaining package 1810 that has two longitudinally extending compartments separated by center panel 1850. As described with respect to previous embodiments, the end closure flaps 848*a*-*b*, 1842*a*-*b*, 1844, 1846*a*-*b* and 1872 are secured in overlapping, face contacting relationship using adhesive or other suitable securing techniques. FIGS. 29 and 30 provide perspective views taken from below of the assembled package 1810. FIG. 31 shows the package 1810 after the severance lines 1862 and 1873 have been cut, so as to create access doors 1878 and 1879.

Figure 32:
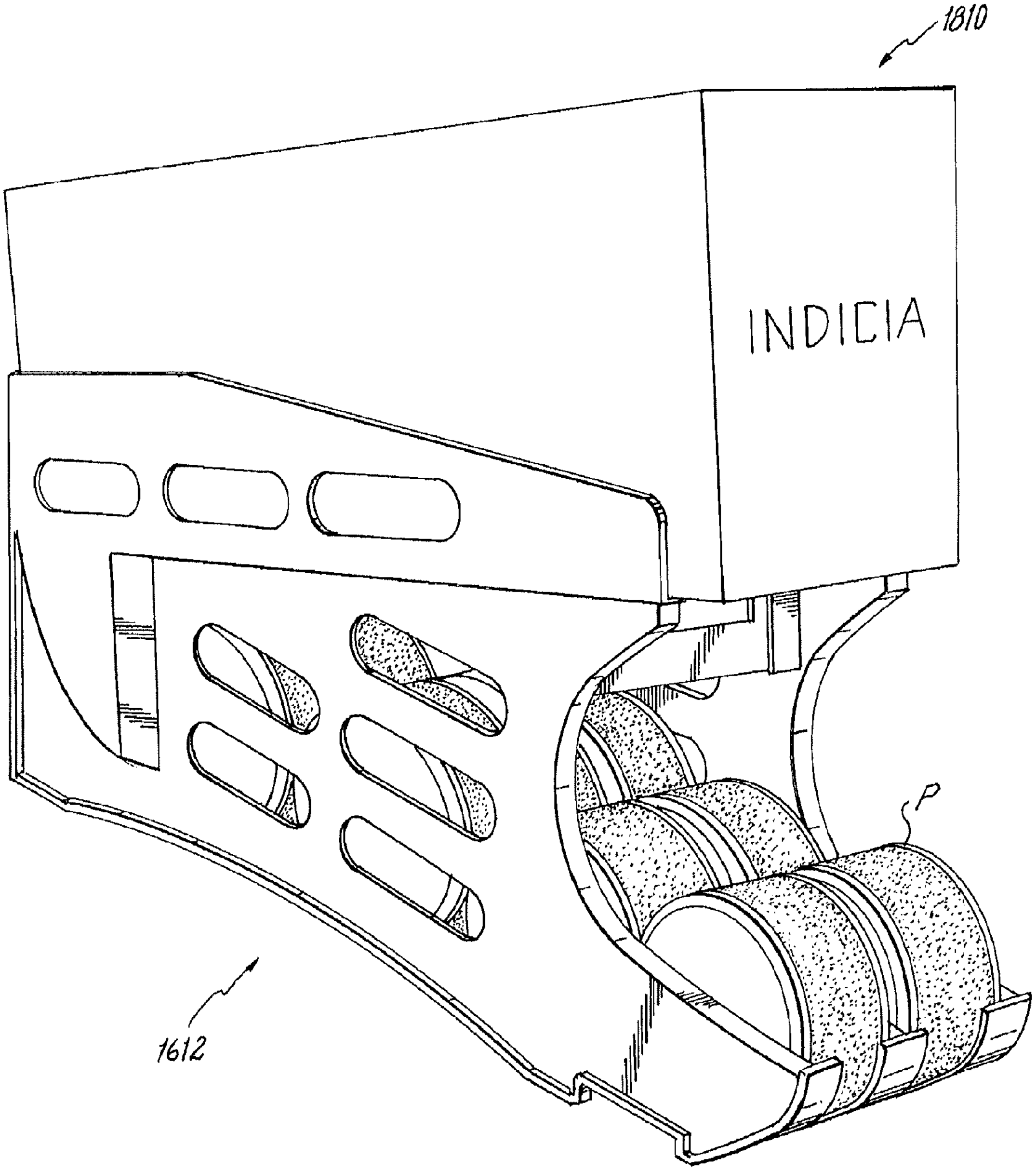
FIG. 32 provides a perspective view of a dispensing and display system that includes the dispensing rack of FIGS. 20-21 and the package of FIG. 29.

In use, package 1810, which is filled with two rows of product containers "P", is placed onto the front end of the upper support deck 1619 of frame 1612. Then the package 1810 is slid longitudinally towards the rear end 1617 of the frame 1612 until the forward edge 1673 of cutting panel 1671 is received within severance notches 1868*a*-*b* of the package 1810. Further longitudinal sliding of the package causes the opening tool 1680 to sever initially the first longitudinal severance line 1862 and then the second lateral severance line 1873. FIG. 32 shows the arrangement where package 1810 has been moved into contact with back or rear wall 1616 of the frame 1612 and the access doors 1878/1879 formed in the bottom panel 1836 have been opened thereby allowing at least a portion of the products P to dispense from the package 1810 onto the lower display deck 1683 and into the lower display area.

Referring now to FIG. 27 which provides a cross-sectional view of frame 1612 and illustrates a method of indicating whether the dispensing and display system is near empty and therefore a new package should be loaded onto the upper support deck 1619. As shown therein, the flag element 1691 is mounted on fulcrum member 1634 and can pivot between a first position, shown using solid lines, and a second position, shown using dashed lines. When a sufficient number of products are stored in the lower display area, the tail end 1634 of the flag element 1961 contacts at least one product and is raised. As a result, the front face 1692 of the flag element 1691 is lowered and the flag element 1691 is in the first position. When the dispensing and display system nears empty, the tail end 1634 of the flag element is not in contact any products and therefore the flag element 1691 moves to the second position in which its front end 1692 is raised and is visible through the viewing window 1693 provided in the front panel 1620 of the floor member 1613. The front end 1692 of the flag element 1691 can be painted red, for example, in order to provide a visual indication in the viewing window 1693 that the display and dispensing system is near empty. Those skilled in the art would readily appreciate that other methods for indicating that the system is near empty can be employed without departing from the inventive aspects of the present disclosure.

It can be appreciated that various changes may be made within the scope of the present invention, for example, the size and shape of the panels and apertures may be adjusted to accommodate articles of differing size or shape. Where as many embodiments of the invention have been illustrated using cartons containing twelve articles disposed in a 4×3 array, it is envisaged that in other embodiments of the invention the cartons contain a greater or lesser number of articles than twelve and the articles are arranged in any suitable configuration such as a 2×6 array.

Furthermore, though the invention has been described in the contact of a paperboard carton and plastic dispensing device, in other embodiments of the invention it is envisaged that other suitable foldable sheet material may be used for forming the carton (such as cardboard, plastics material and the like) or that the carton or magazine for articles may formed as a reusable dispenser with a reusable opening mechanism. Furthermore the dispensing device may be formed from other materials or combinations of materials for example: metal, wood, fibre glass, glass-reinforced plastic.

The carton 10, 110, 210 1830 may take various forms. In the above disclosure, detailed description and illustration of four different and exemplary cartons 10, 110, 210 and 1830 are provided (see FIGS. 3A-3D; 5A-5D, 8A-8D and 28). Each of these cartons 10, 110, 210 and 1830 is a fully enclosed carton of the end loading type, however, it will be understood that the benefits described herein can be obtained by using other types of cartons, for example, partially enclosed cartons; top-loading cartons; trays; and wraparound cartons as non-exhaustive examples.

Though the articles illustrated are either bottles (FIGS. 1A-2) or cans (FIGS. 7A-7C, 13A-13G and 31-32) the invention is applicable to a wide variety of products contained in various containers. Preferably, the containers have at least a cylindrical portion to encourage rolling of the articles from the carton through the lower level of the display device and into the dispensing position. However, the dispensing device apparatus of the present invention is applicable to other types and/or shapes and/or sizes of articles. However, where advantage cannot be taken of the gravity and rolling to provide the forward feed mechanism, other devices may be provided, for example: a sprung biased mechanism or other suitable means.

It is also envisaged that the cartons in other embodiments are provided with a means for detecting when the carton is empty of articles without having to lift or too closely inspect the carton. Such means for detecting when the carton is empty of articles may take the form of a window, i.e. an aperture or shaped cut-out in the carton; such a window may be disposed close to the bottom of the carton so that the presence or not of articles in the lowermost tier of the carton can be detected by observation. In some embodiments the window could be provided by piece, strip or section of clear, transparent or translucent material, such as plastic sheet to enable the interior of the carton to be viewed, yet maintaining the structural integrity and barrier to dust etc of the carton. Alternatively, an inspection hole or aperture may be provided into which a pen or other instrument could be inserted in order to feel for the presence of articles in the lowermost row.

Whereas cutting elements shown in the illustrated examples may have been shown in a fixed position, these fixed cutting elements alternatively could be provided with means for enabling the cutting elements to be retracted, such as the retractable means shown in FIGS. 10A and 10B. The retractable mechanism described herein provides an exemplary format of a mechanism suitable for enabling a package opening arrangement to be retracted into a stowed position. The shape of the tool, shape of the levering button, the shape of the pivotal fixing and shape of the biasing member could be varied in other embodiments from that shown and it will be understood that the mechanism described and illustrated is one example only and this aspect of the invention can be variously employed without requiring the particular shapes, materials, configurations and sizes shown herein.

Whereas reference has been made to inclined ramps 283, inclined grooves 7*a*, 7*b*, and the support element 14*a*, 14*b* being inclined, it will be understood that these features act individually or in combination to provide a forward feeding mechanism that encourages articles that have been dispensed from the carton or package to roll out of the package, onto the lower tier or lower track and then toward the front-end of the lower track. Such a forward feeding mechanism takes the form of an inclined surface or groove where the forward feeding mechanism utilizes the force of gravity and hence the articles suitable for being dispensed in this manner have a rounded portion (i.e. jars, bottles, cans, rounded yoghurt pots, conical articles, and lipsticks as examples). It will be understood that in taking advantage of a gravity feed mechanism that the forward feed mechanism may be provided in a number of ways using ramps, grooves and even features integral to the carton itself (for example an internal ramp disposed within the carton to encourage the front lower most article to roll toward the access opening would alleviate the need for the supporting element itself to be inclined). The following described examples of the forward feeding mechanism being provided by the supporting element being arranged at an inclined angle relative to a lower plane of the lower track, and/or by an inclined floor of the lower track and/or by the back being scoop-shaped or suitably shaped to encourage forward rolling of articles and/or by one or more ramps extending at an inclined angle from the back toward a lower plane of the lower track are mere examples. In other applications, the articles may not be rounded and the force of gravity may need to be supplemented with an additional or alternative mechanism to encourage articles to be fed-forward to the front-most dispensing position. Such additional or alternative mechanism could be provided by a biasing member; a piston or plunger as examples.

Reference has been made to cutting element, cutting tool and package opening device to cover the element of the display and dispensing device that engages with a package installed in the device to break weakened areas of that package for causing an opening to be created. As such cutting element may not actually have a sharpened blade capable of slicing through material, but rather may be an abutment or projection that is positioned to co-operate with the preformed weakened area of a carton to cause the breaking of perforations when the carton is pushed against the cutting element. In some embodiments, a bladed element or sharpened blade may be provided. In other embodiments cutting element is taken to mean any projection or obstacle that interacts or engages with the carton as that carton is installed to break open that carton. The cutting elements may take a variety of shapes, sizes, positions, number and be formed from a variety of materials in other envisaged implementations of the invention and therefore the cutting elements should not be taken to be limited to only those illustrated and described herein.

Whereas in the illustrated embodiments, the package opening tool co-operates with the carton by causing part of the carton to be broken, as the carton is pushed or slidably installed into the display and dispensing device, it is envisaged that in other embodiments the package opening tool provided will co-operate with the carton to cause an opening to be created by causing the carton to be maintained stationary or substantially motionless. For example, in another envisaged embodiment, the package comprises an outer sleeve and an inner carton component (e.g., an inner tray, drawer or tubular structure) having an open bottom that is sealed by the presence of the outer sleeve. One or more package opening tools provided on the device are insertable into the inner carton component and thereby hold that inner carton component substantially stationary. The outer sleeve is then moved relative to the inner carton component, by pulling, or pushing for example, to cause sliding movement of the outer sleeve relative to the inner carton component and thereby exposing at least part of the bottom opening of the inner component so that articles can be dispensed therefrom. In this manner, the package opening tool does not necessarily directly cause a cutting or breaking of the carton in order for an access opening to be created for the carton. The package opening device does interact with the carton to cause opening of the carton whilst the carton is installed in the device or display and dispensing device. In one specific embodiment, it is envisaged that the package opening device is formed as a pair of hooked pins, each insertable into an aperture or weakened tab of the inner carton component to engage that component. The outer sleeve has a pair of apertures or slots aligned with the aperture or weakened tab of the inner carton component to allow for easy insertion of the package opening tool into the inner carton component. The outer sleeve may be affixed or adjoined in some manner (such as by adhesive or by a panel) that is broken by the relative movement between the inner carton component and outer sleeve to allow the opening in the bottom of the inner carton component to be exposed for dispensing articles.

It will be recognised that as used herein, directional references such as “top”, “bottom”, “front”, “back”, “end”, “side”, “inner”, “outer”, “upper” and “lower” do not limit the respective panels to such orientation, but merely serve to distinguish these panels from one another. Any reference to hinged connection should not be construed as necessarily referring to a single fold line only; indeed it is envisaged that hinged connection can be formed from one or more of the following, a short slit, a frangible line or a fold line without departing from the scope of the invention.

What is claimed is:

1. A dispensing system comprising:

a) a plurality of products provided initially in a package, the package comprising a first wall that defines a weakened severance line and a second wall that defines an opening, the products having a diameter associated therewith;

b) a frame having longitudinally opposed front and rear end sections and including laterally opposed first and second sides extending between the front and rear end sections and an upper support deck extending at least partially between the front and rear end sections and below which a product display area is provided, the product display area being proximate the front end section; and c) an opening tool positioned between the first and second sides, the opening tool including a forward edge longitudinally spaced from the rear end section such that the opening tool passes through the opening in the second wall and severs the weakened severance line to define first and second access doors when the package is moved longitudinally along the upper support deck from the front end section to the rear end section, the first and second access doors being moveable toward the first and second sides, respectively, to allow the products to be at least partially dispensed from the package into the product display area, wherein the longitudinal spacing between the forward edge and the rear end section is greater than the diameter of the products.

2. The dispensing system as recited in claim 1, wherein the frame includes a lower display deck.

3. The dispensing system as recited in claim 1, wherein the frame includes a rear wall which is configured to guide products to the product display area.

4. The dispensing system as recited in claim 1, wherein the upper support deck is inclined at an acute angle with respect to a horizontal plane.

5. The dispensing system as recited in claim 1, wherein the opening tool is connected to the frame.

6. The dispensing system as recited in claim 1, wherein the upper support deck includes two longitudinally extending rails.

7. The dispensing system as recited in claim 1, wherein the first and second laterally opposed sides of the frame are adapted and configured for guiding the package as it is moved longitudinally along the upper support deck.

8. The dispensing system as recited in claim 1, wherein the package is a paperboard carton.

9. A dispensing and display system comprising:

a) a plurality of products provided initially in a package, the package comprising a first wall that defines a weakened severance line and a second wall that defines an opening, the products having a diameter associated therewith;

b) a frame having longitudinally opposed front and rear end sections and including:

i. laterally opposed first and second sides extending between the front and rear end sections;

ii. an upper support shelf extending at least partially between the front and rear end sections; and iii. a lower display deck for at least partially defining a product display area below the upper support shelf, the product display area being proximate the front end section; and c) an opening tool positioned between the first and second sides, the opening tool including a forward edge longitudinally spaced from the rear end section such that the opening tool passes through the opening in the second wall and severs the weakened severance line to define first and second access doors when the package is moved longitudinally along the upper support deck of the frame from the front end section toward the rear end section, the first and second access doors being moveable toward the first and second sides, respectively, to allow the products to be at least partially dispensed from the package into the product display area, wherein the longitudinal spacing between the forward edge and the rear end section is greater than the diameter of the products.

10. The dispensing and display system as recited in claim 9, wherein the frame includes a lane divider to create two display channels within the product display area.

11. A dispensing method comprising the steps of:

a) providing a package containing a plurality of products, the package comprising a first wall that defines a weakened severance line and a second wall that defines an opening, the products having a diameter associated therewith;

b) providing a frame having longitudinally opposed front and rear end sections and including laterally opposed first and second sides extending between the front and rear end sections and an upper support deck extending at least partially between the front and rear end sections and below which a product display area is provided, the product display area being proximate the front end section;

c) providing an opening tool associated with the frame, the opening tool being centered positioned between the first and second sides and including a forward edge longitudinally spaced from the rear end section, wherein the longitudinal spacing between the forward edge and the rear end section is greater than the diameter of the products; and d) sliding the package longitudinally relative to the opening tool along the upper support deck from the front end section to the rear end section such that the opening tool passes through the opening in the second wall and severs the weakened severance line to define first and second access doors, the first and second access doors being moveable toward the first and second sides, respectively, to allow the products to be at least partially dispensed from the package into the product display area.

12. The dispensing system as recited in claim 1, wherein the opening tool includes a panel longitudinally extending from the forward edge toward the rear end section of the frame.

* * * * *